(12) United States Patent
Asano et al.

(10) Patent No.: US 10,389,259 B2
(45) Date of Patent: Aug. 20, 2019

(54) POWER SUPPLY APPARATUS AND IMAGE FORMING APPARATUS SWITCHING A CAPACITANCE VALUE OF A RESONANCE CAPACITOR AT A TIME OF A CONTINUOUS OPERATION AND AN INTERMITTENT OPERATION

(71) Applicant: CANON KABUSHIKI KAISHA, Tokyo (JP)

(72) Inventors: Hiroki Asano, Kawasaki (JP); Yasuhiro Shimura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/058,280

(22) Filed: Aug. 8, 2018

(65) Prior Publication Data
US 2019/0058406 A1  Feb. 21, 2019

(30) Foreign Application Priority Data

Aug. 15, 2017 (JP) ................. 2017-156869
Jul. 5, 2018 (JP) ................. 2018-128366

(51) Int. Cl.
| | | |
|---|---|---|
| H02M 3/335 | (2006.01) |
| G03G 15/00 | (2006.01) |
| H02M 1/08 | (2006.01) |
| H02M 1/36 | (2007.01) |
| H02M 1/00 | (2006.01) |

(52) U.S. Cl.
CPC ........ *H02M 3/33569* (2013.01); *G03G 15/80* (2013.01); *H02M 1/08* (2013.01); *H02M 1/36* (2013.01); *H02M 2001/0006* (2013.01)

(58) Field of Classification Search
CPC ......... H02M 3/33507; H02M 3/33515; H02M 3/33569; H02M 3/33576; H02M 1/08; H02M 1/14; H02M 1/32; H02M 5/257; H02M 5/456; H02M 5/458; H02M 5/4585; H02M 1/36; G03G 15/80
USPC .................................................. 363/34, 37
See application file for complete search history.

(56) References Cited

U.S. PATENT DOCUMENTS

| | | | | |
|---|---|---|---|---|
| 9,823,617 B2 * | 11/2017 | Shimura | ............... | G03G 15/80 |
| 9,897,964 B2 * | 2/2018 | Shimura | ............... | G03G 15/80 |
| 9,966,865 B2 * | 5/2018 | Shimura | ........... | H02M 3/33569 |
| 2017/0176918 A1 * | 6/2017 | Shimura | ............... | G03G 15/80 |
| 2018/0212508 A1 * | 7/2018 | Kobayashi | ......... | G03G 15/5004 |
| 2018/0316269 A1 * | 11/2018 | Shimura | ........... | H02M 3/33507 |

FOREIGN PATENT DOCUMENTS

JP    2009-100554    5/2009

OTHER PUBLICATIONS

U.S. Appl. No. 15/958,344, filed Apr. 20, 2018, by Yasuhiro Shimura et al.

(Continued)

*Primary Examiner* — Yemane Mehari
(74) *Attorney, Agent, or Firm* — Venable LLP

(57) ABSTRACT

The power supply apparatus switches the capacitance of a resonance capacitor to a first value at the time of a continuous operation, and switches the capacitance of the resonance capacitor to a second value smaller than the first value at the time of an intermittent operation.

19 Claims, 15 Drawing Sheets

(56) References Cited

OTHER PUBLICATIONS

U.S. Appl. No. 16/030,499, filed Jul. 9, 2018, by Yusuke Saito et al.
U.S. Appl. No. 16/057,636, filed Aug. 7, 2018, by Yasuhiro Shimura.
U.S. Appl. No. 16/058,289, filed Aug. 8, 2018, by Yasuhiro Shimura et al.

* cited by examiner

FIG.2A  VOLTAGE BETWEEN GATE AND SOURCE IN FET1 (DRV-L)
FIG.2B  VOLTAGE BETWEEN GATE AND SOURCE IN FET2 (DRV-H)
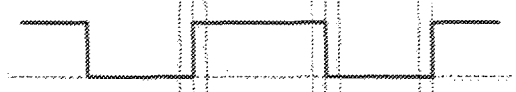
FIG.2C  VOLTAGE BETWEEN DRAIN AND SOURCE IN FET1
FIG.2D  DRAIN CURRNET IN FET1 (INCLUDING CURRENT FLOWING IN D1 AND C11)
FIG.2E  DRAIN CURRNET IN FET2 (INCLUDING CURRENT FLOWING IN D2)
FIG.2F  DRAIN CURRNET IN D21
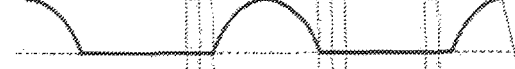

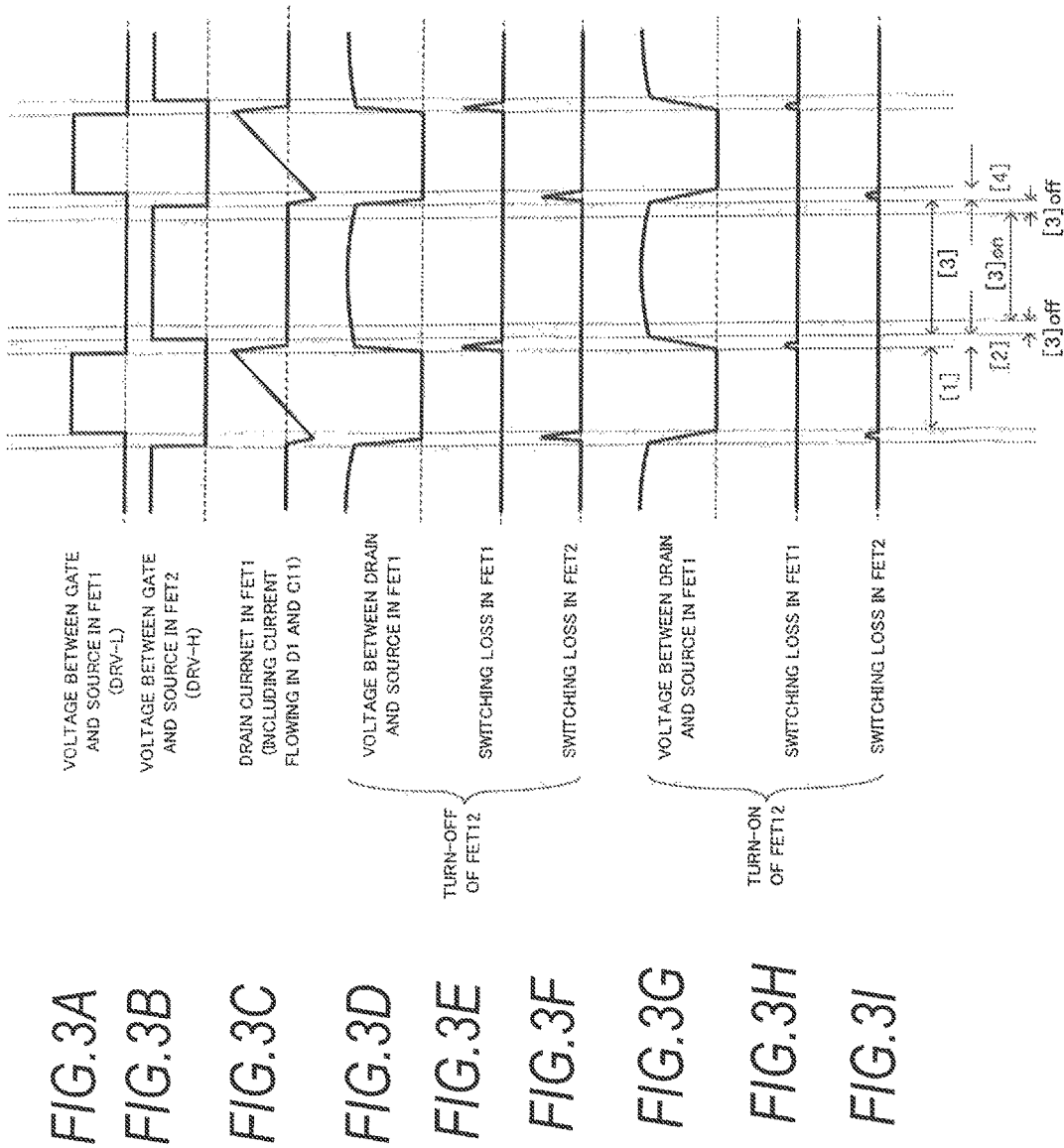

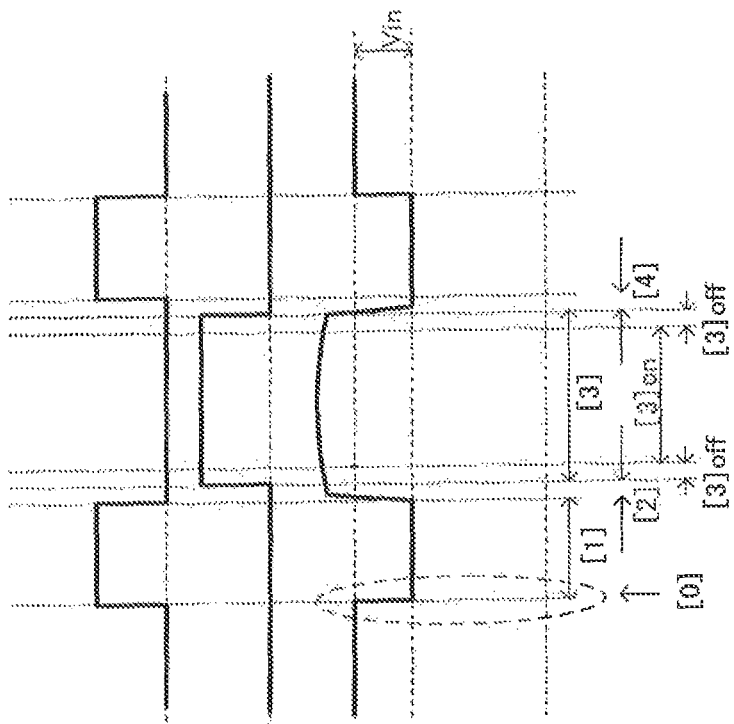

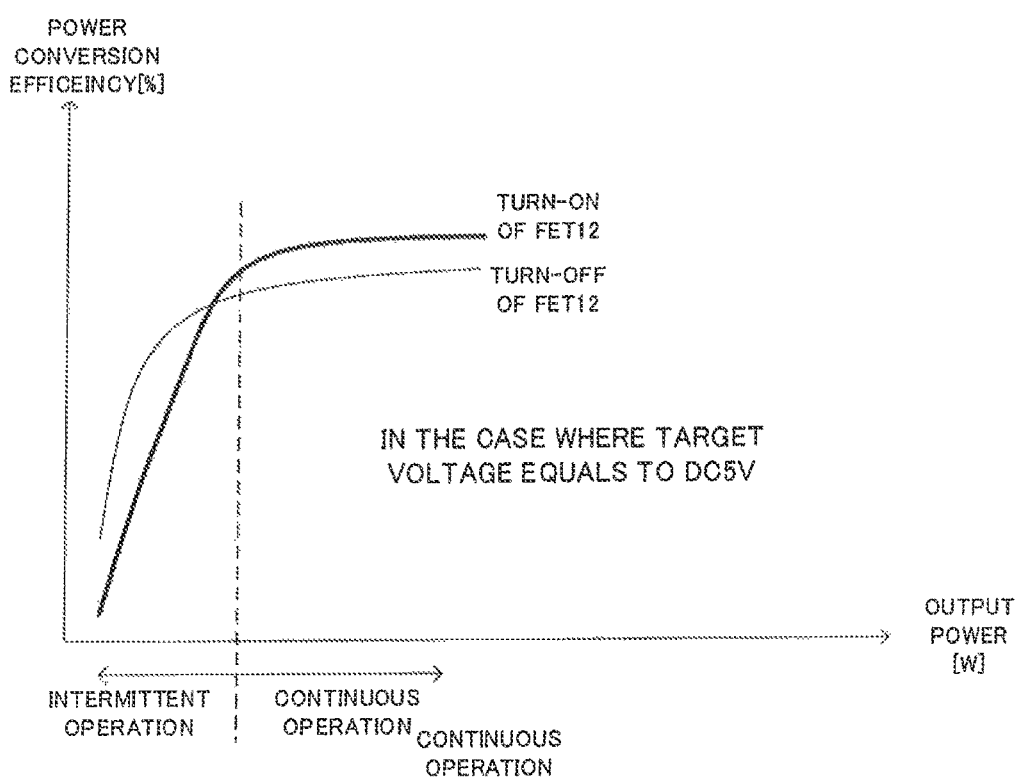

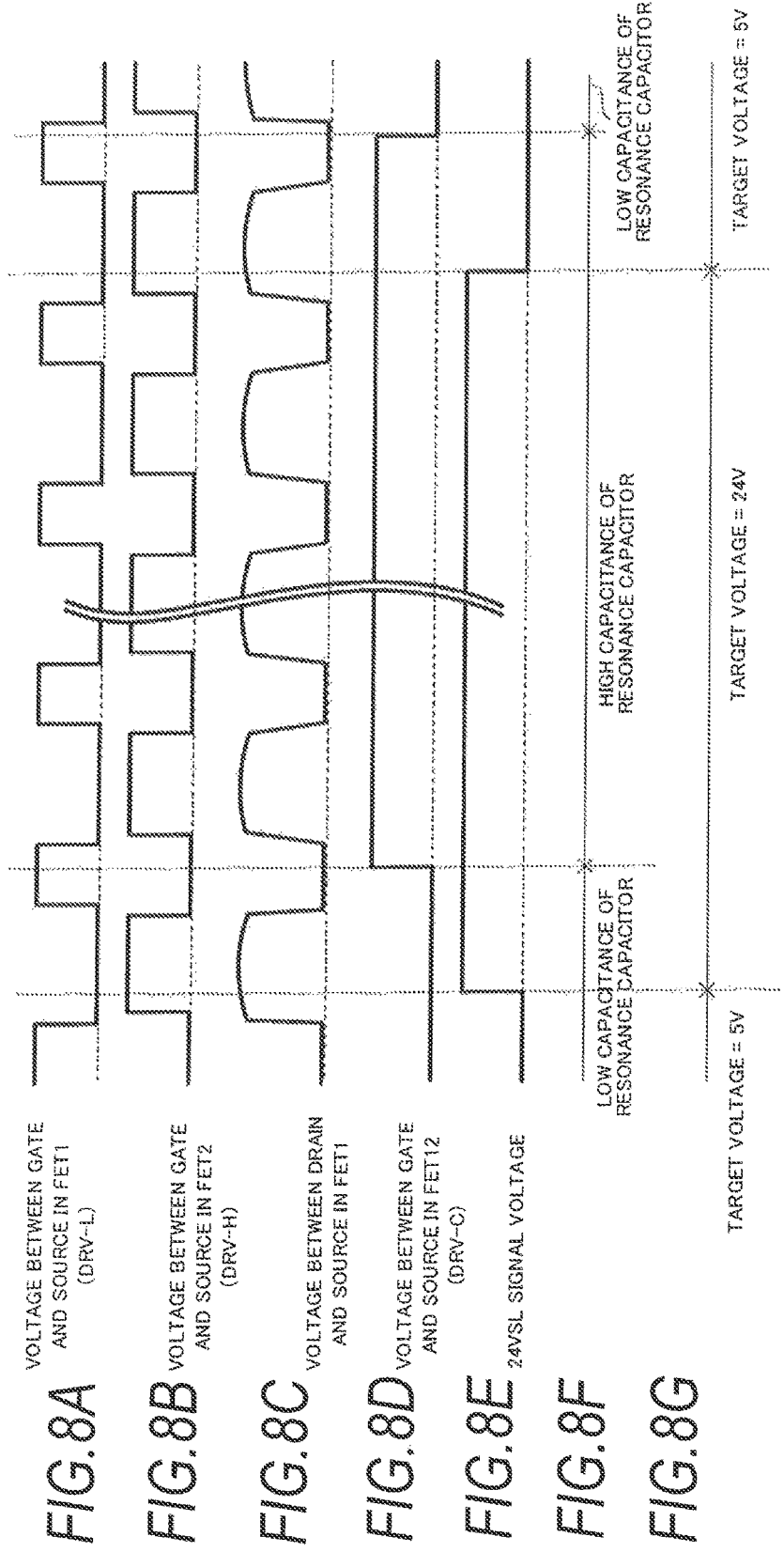

FIG.9

| | Power Supply Voltage (Vout) = 5V | Power Supply Voltage (Vout) = 24V |
|---|---|---|
| RESONANCE CAPACITOR WITH LOW CAPACITANCE | (a) SURGE CURRENT VOLTAGE CHARGED IN CAPACITOR C2IN CLAMPER (BOLD LINE) MIDDLE | (b) LARGE |
| RESONANCE CAPACITOR WITH HIGH CAPACITANCE | (c) SURGE CURRENT VOLTAGE CHARGED IN CAPACITOR C2IN CLAMPER (BOLD LINE) SMALL | (d) MIDDLE |

POWER SUPPLY APPARATUS AND IMAGE FORMING APPARATUS SWITCHING A CAPACITANCE VALUE OF A RESONANCE CAPACITOR AT A TIME OF A CONTINUOUS OPERATION AND AN INTERMITTENT OPERATION

BACKGROUND OF THE INVENTION

Field of the Invention

The present invention relates to a switching power supply apparatus and an image forming apparatus that use an active clamp method for an insulated type converter using a flyback transformer.

Description of the Related Art

An active clamping power supply apparatus using a flyback transformer is known as one of the configurations of a power supply apparatus having a high power efficiency for both light load and heavy load. In order to obtain a higher power efficiency, Japanese Patent Application Laid-Open No. 2009-100554 proposes a power supply apparatus configured to achieve a high power efficiency both at the time of light load and at the time of heavy load by switching the capacitance of a resonance capacitor connected in parallel with a switching element, according to the magnitude of load to which power is supplied. Note that the power efficiency (also called the power conversion efficiency) is represented by the ratio of the power output by the power supply apparatus to the power supplied to the power supply apparatus.

As described above, in the power supply apparatus, the capacitance of a resonance capacitor is switched according to the load to which the power is supplied. Especially, in a partial resonance type power supply apparatus, such as the active clamping power supply apparatus using a flyback transformer, in order to achieve a stable switching operation and a further improvement of the power efficiency, the timing for switching the capacitance of a resonance capacitor has been an important issue.

SUMMARY OF THE INVENTION

One aspect of the present invention is an image forming apparatus including a transformer including a primary winding and a secondary winding, a first switching element connected in series to the primary winding of the transformer, a first resonance capacitor connected in parallel with the first switching element, a second resonance capacitor connected in parallel with the first switching element, a third switching element connected in series to the second resonance capacitor, a second switching element connected in parallel with the primary winding of the transformer, a capacitor connected in series to the second switching element, and connected in parallel with the primary winding of the transformer with the second switching element, a feedback unit configured to output information according to a voltage induced by the secondary winding of the transformer, and a control unit configured to, based on the information input from the feedback unit, control turn-on or turn-off of the first switching element by a first control signal, and to control turn-on or turn-off of the second switching element by a second control signal, the control unit being capable of performing a continuous operation repeating a period for performing a switching operation that alternately turns on or turns off the first switching element and the second switching element before and after a dead time at which both of the first switching element and the second switching element are turned off, and capable of performing an intermittent operation alternately repeating a period for performing the switching operation and a period for stopping the switching operation, and the control unit turning on the third switching element at the time of the continuous operation, and turning off the third switching element at the time of the intermittent operation.

Another aspect of the present invention is an image forming apparatus including an image forming unit configured to perform image formation on a recording material, and a power supply apparatus configured to supply power to the image forming apparatus, the power supply apparatus including a transformer including a primary winding and a secondary winding, a first switching element connected in series to the primary winding of the transformer, a first resonance capacitor connected in parallel with the first switching element, a second resonance capacitor connected in parallel with the first switching element, a third switching element connected in series to the second resonance capacitor, a second switching element connected in parallel with the primary winding of the transformer, a capacitor connected in series to the second switching element, and connected in parallel with the primary winding of the transformer with the second switching element, a feedback unit configured to output information according to a voltage induced by the secondary winding of the transformer, and a control unit configured to, based on the information input from the feedback unit, control turn-on or turn-off of the first switching element by a first control signal, and to control turn-on or turn-off of the second switching element by a second control signal, the control unit being capable of performing a continuous operation repeating a period for performing a switching operation that alternately turns on or turns off the first switching element and the second switching element before and after a dead time at which both of the first switching element and the second switching element are turned off, and capable of performing an intermittent operation alternately repeating a period for performing the switching operation and a period for stopping the switching operation, and the control unit turns on the third switching element at the time of the continuous operation, and turns off the third switching element at the time of the intermittent operation.

A further aspect of the present invention is an image forming apparatus including a transformer including a primary winding and a secondary winding, a first switching element connected in series to the primary winding of the transformer, a resonance capacitor connected in parallel with the first switching element, a second switching element connected in parallel with the primary winding of the transformer, a capacitor connected in series to the second switching element, and connected in parallel with the primary winding of the transformer with the second switching element, a feedback unit configured to output information according to a voltage induced by the secondary winding of the transformer, a control unit configured to, based on the information input from the feedback unit, control turn-on or turn-off of the first switching element by a first control signal, and to control turn-on or turn-off of the second switching element by a second control signal, the control unit being capable of performing a continuous operation repeating a period for performing a switching operation that alternately turns on or turns off the first switching element and the second switching element before and after a dead time at which both of the first switching element and the second switching element are turned off, and capable of performing an intermittent operation alternately repeating a period for performing the switching operation and a period for stopping the switching operation, and a capacitance switching unit configured to switch the capacitance of the resonance capacitor to a first value at the time of the continuous operation, and to switch the capacitance of the resonance capacitor to a second value smaller than the first value at the time of the intermittent operation.

A still further aspect of the present invention is an image forming apparatus including an image forming unit configured to perform image formation on a recording material, and a power supply apparatus configured to supply power to the image forming apparatus, the power supply apparatus including a transformer including a primary winding and a secondary winding, a first switching element connected in series to the primary winding of the transformer, a resonance capacitor connected in parallel with the first switching element, a second switching element connected in parallel with the primary winding of the transformer, a capacitor connected in series to the second switching element, and connected in parallel with the primary winding of the transformer with the second switching element, a feedback unit configured to output information according to a voltage induced by the secondary winding of the transformer, a control unit configured to, based on the information input from the feedback unit, control turn-on or turn-off of the first switching element by a first control signal, and to control turn-on or turn-off of the second switching element by a second control signal, the control unit being capable of performing a continuous operation repeating a period for performing a switching operation that alternately turns on or turns off the first switching element and the second switching element before and after a dead time at which both of the first switching element and the second switching element are turned off, and capable of performing an intermittent operation alternately repeating a period for performing the switching operation and a period for stopping the switching operation, and a capacitance switching unit configured to switch the capacitance of the resonance capacitor to a first value at the time of the continuous operation, and to switch the capacitance of the resonance capacitor to a second value smaller than the first value at the time of the intermittent operation.

Further features of the present invention will become apparent from the following description of exemplary embodiments with reference to the attached drawings.

BRIEF DESCRIPTION OF THE DRAWINGS

FIGS. 2A, 2B, 2C, 2D, 2E and 2F are diagrams for describing control methods of Embodiments 1 and 2.

FIGS. 3A, 3B, 3C, 3D, 3E, 3F, 3G, 3H, 3I, 3J, 3K and 3L are diagrams for describing circuit operations due to the difference in the capacitance of a resonance capacitor of Embodiment 1.

FIGS. 7A and 7B are graphs showing the relationship between the output power and the power conversion efficiency in Embodiment 2.

FIGS. 8A, 8B, 8C, 8D, 8E, 8F and 8G are diagrams for describing the switching timing of the resonance capacitor in Embodiment 2.

FIG. 9 is a diagram showing the difference in the voltage waveform between a drain terminal and a source terminal in a FET1 due to the difference in the capacitance of the resonance capacitor.

DESCRIPTION OF THE EMBODIMENTS

Preferred embodiments of the present invention will now be described in detail in accordance with the accompanying drawings.

Hereinafter, a detailed description is given of Embodiments 1 to 3 of the present invention with reference to the drawings.

<Embodiment 1>
[Configuration of Power Supply Apparatus]

Figure 1:
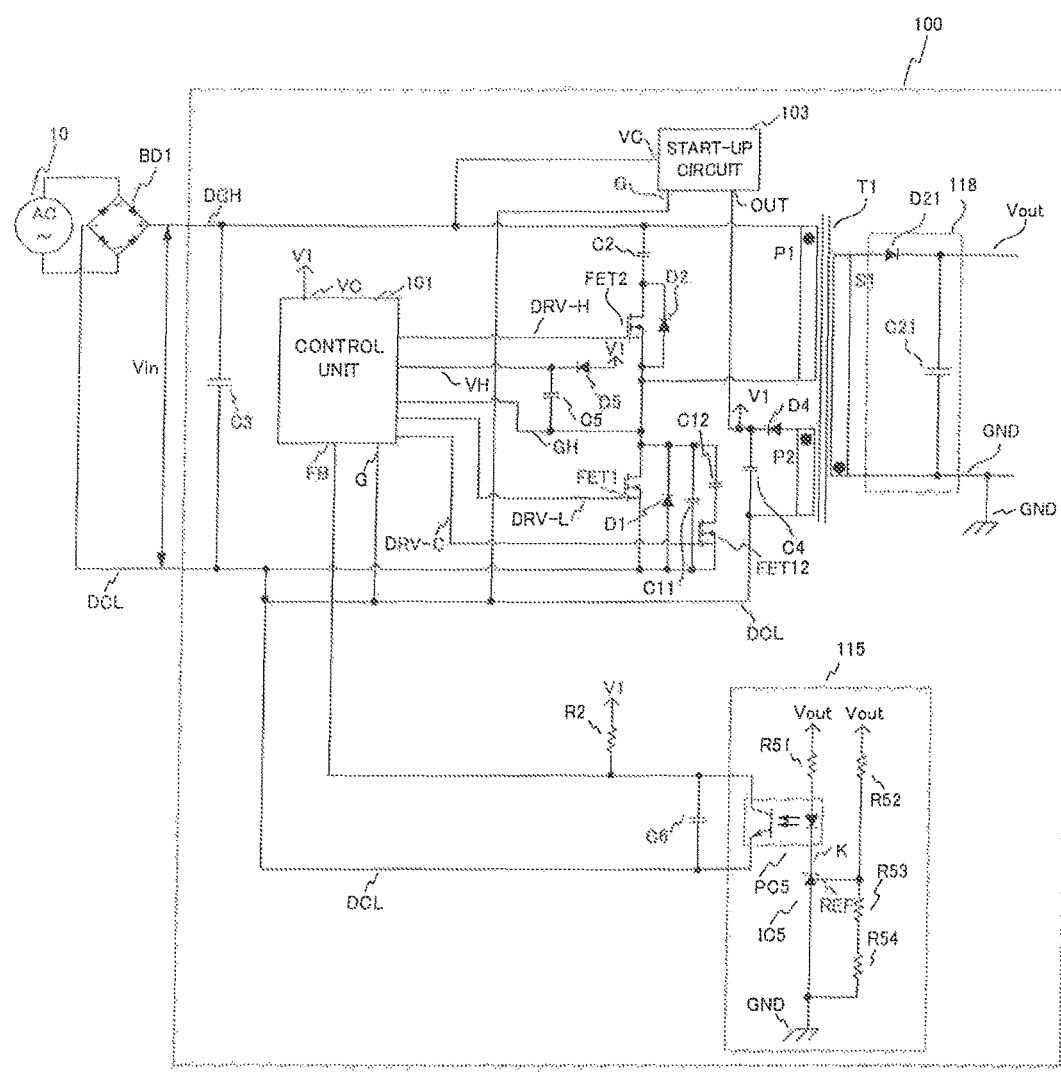
FIG. 1 is a schematic diagram of a power supply circuit of Embodiment 1.

First, a description is given of a flyback power supply apparatus using an active clamping method of Embodiment 1 with reference to the drawings. FIG. 1 is a circuit diagram showing the outline of a switching power supply circuit using the active clamping method of Embodiment 1. In the flyback power supply apparatus of this embodiment, an alternating voltage is input from an alternating current power supply 10 such as a commercial power supply, and the voltage rectified by a bridge diode BD1, which is a full wave rectification means, is input to a switching power supply circuit 100. In the switching power supply circuit 100, a smoothing capacitor C3 is used as a smoothing means of the voltage rectified by the bridge diode BD1, and a lower potential and a higher potential of the smoothing capacitor C3 are defined as DCL and DCH, respectively. The switching power supply circuit 100 outputs a power supply voltage Vout to an insulated secondary side of a transformer T1 from an input voltage Vin charged by the smoothing capacitor C3.

The switching power supply circuit 100 includes the insulated type transformer T1 provided with a primary winding P1 and an auxiliary winding P2 on a primary side, and a secondary winding S1 on the secondary side. Energy is supplied from the primary winding P1 to the secondary winding S1 of the transformer T1 by a switching operation, which is described with reference to FIGS. 2A to 2G described later. The auxiliary winding P2 of the transformer T1 is used to rectify and smooth, by a diode D4 and a capacitor C4, a forward voltage of the input voltage Vin that is applied to the primary winding P1, and to supply a power supply voltage V1.

On the primary side of the switching power supply circuit 100, a field effect transistor (hereinafter referred to as the FET) 1, which is a first switching element, is connected in series to the primary winding P1 of the transformer T1.

Additionally, a voltage clamping capacitor C2 and a FET2, which is a second switching element, are connected in series, and the voltage clamping capacitor C2 and the FET2, which are connected in series, are connected in parallel with the primary winding P1 of the transformer T1. Further, a control unit 101 for controlling the driving of the FET1 and the FET2 is provided on the primary side of the switching power supply circuit 100.

The control unit 101, which is a control means, drives the FET1 by outputting a high-level control signal DRV-L, and drives the FET2 by outputting a high-level control signal DRV-H. The power supply voltage V1 is supplied between a VC terminal and a G terminal of the control unit 101. Note that, in order to drive the FET2, the power supply voltage V1 is supplied between a VH terminal and a GH terminal of the control unit 101 by a charge pump circuit formed by a capacitor C5 and a diode D5.

A resonance capacitor C11, which is a first resonance capacitor, and a circuit where a resonance capacitor C12, which is a second resonance capacitor, and the FET12, which is a third switching element, are connected in series are connected in parallel with the FET1. Note that the resonance capacitors C11 and C12 and the FET12 form a resonance capacitor unit, and a resonance capacitor having a lower electrostatic capacity than that of the resonance capacitor C12 is selected as the resonance capacitor C11 (C11<<C12). Additionally, the on/off control of the FET12 is performed by a control signal DRV-C, which is output from the control unit 101. When the FET12 is in a turn-off state, only the resonance capacitor C11 is connected in parallel with the FET1, and the capacitance of the resonance capacitor at this moment is the capacitance of the resonance capacitor C11. On the other hand, when the FET12 is in a turn-on state, the resonance capacitor C11 and the resonance capacitor C12 are connected in parallel with the FET1, and the capacitance of the resonance capacitor at this moment is the capacitance obtained by adding the respective capacitances of the resonance capacitors C11 and C12. Note that the capacitance between a drain terminal and a source terminal in the FET1 may be used without providing the resonance capacitor C11.

Additionally, a diode D1 connected in parallel with the FET1 in FIG. 1 is a body diode of the FET1. Similarly, a diode D2 connected in parallel with the FET2 is also a body diode of the FET2. Note that the control unit 101 may use, for example, an IC formed by an analog circuit, or may use an arithmetic control element (for example, a CPU, an ASIC, and the like) operating with a clock signal generated by an oscillator, etc.

On the secondary side of the switching power supply circuit 100, a rectification smoothing circuit 118 is provided that is formed by a diode D21 and a capacitor C21, which are secondary-side rectification means of a flyback voltage generated in the secondary winding S1 of the transformer T1. The voltage induced by the secondary winding S1 of the transformer T1 is rectified and smoothed by the diode D21 and the capacitor C21, and is output as the power supply voltage Vout (also called the output voltage Vout). Additionally, on the secondary side of the switching power supply circuit 100, a feedback unit 115 is provided as a feedback means for feeding back, to the primary side, the information according to the power supply voltage Vout that is output to the secondary side.

The feedback unit 115 is used for controlling the power supply voltage Vout to a predetermined fixed voltage (hereinafter referred to as the target voltage). The voltage value of the power supply voltage Vout is set by a reference voltage, which is the voltage input to a reference terminal REF of a shunt regulator IC5. That is, the power supply voltage Vout is set by voltage dividing resistors R52, R53 and R54. When the voltage of the power supply voltage Vout becomes higher than the target voltage, a current flows from a cathode terminal K of the shunt regulator IC5, and a secondary-side diode of a photocoupler PC5 is in a conduction state via a pull-up resistor R51. Accordingly, a primary-side phototransistor of the photocoupler PC5 is operated, and an electric charge is discharged from a capacitor C6. For this reason, the input voltage of a FB terminal of the control unit 101 is decreased. On the other hand, when the voltage of the power supply voltage Vout becomes lower than the target voltage, the secondary-side diode of the photocoupler PC5 is in a nonconduction state. Accordingly, the primary-side phototransistor of the photocoupler PC5 becomes the turn-off state, and a current charging a capacitor C6 flows from the power supply voltage V1 via a resistor R2. For this reason, the input voltage of the FB terminal (hereinafter referred to as the FB terminal voltage) of the control unit 101 is increased. In this manner, the feedback unit 115 changes the FB terminal voltage of the control unit 101 according to the variation of the power supply voltage Vout.

The control unit 101 is performing feedback control for controlling the power supply voltage Vout to be the target voltage by detecting the FB terminal voltage that is input from the feedback unit 115. In this manner, the control unit 101 can indirectly perform the feedback control of the power supply voltage Vout by monitoring the FB terminal voltage. Additionally, the feedback control of the power supply voltage Vout may be directly performed by monitoring the power supply voltage Vout by providing the control unit 101 on the secondary side, instead of the feedback unit 115. Since the control unit 101 can recognize the state of load by monitoring the FB terminal voltage, the control unit 101 can perform appropriate control according to the state of load. In order to more correctly determine the state of the load, a current detecting means may be provided in the path for supplying power to the FET1 and the load of the switching power supply circuit 100. A means for determining the light-load state in this embodiment is described as using the FB terminal voltage of the control unit 101.

A start-up circuit 103 is a three-terminal regulator or a step-down switching power supply circuit, and converts the input voltage Vin that is input between a VC terminal and a G terminal, and outputs the power supply voltage V1 from an OUT terminal. The start-up circuit 103 is a circuit operated only when the power supply voltage V1 supplied from the auxiliary winding P2 is equal to or less than a predetermined voltage value, and is used for supplying the power supply voltage V1 at the time of activating the switching power supply circuit 100.

[Control Method of Switching Power Supply Circuit]

Figure 2G:
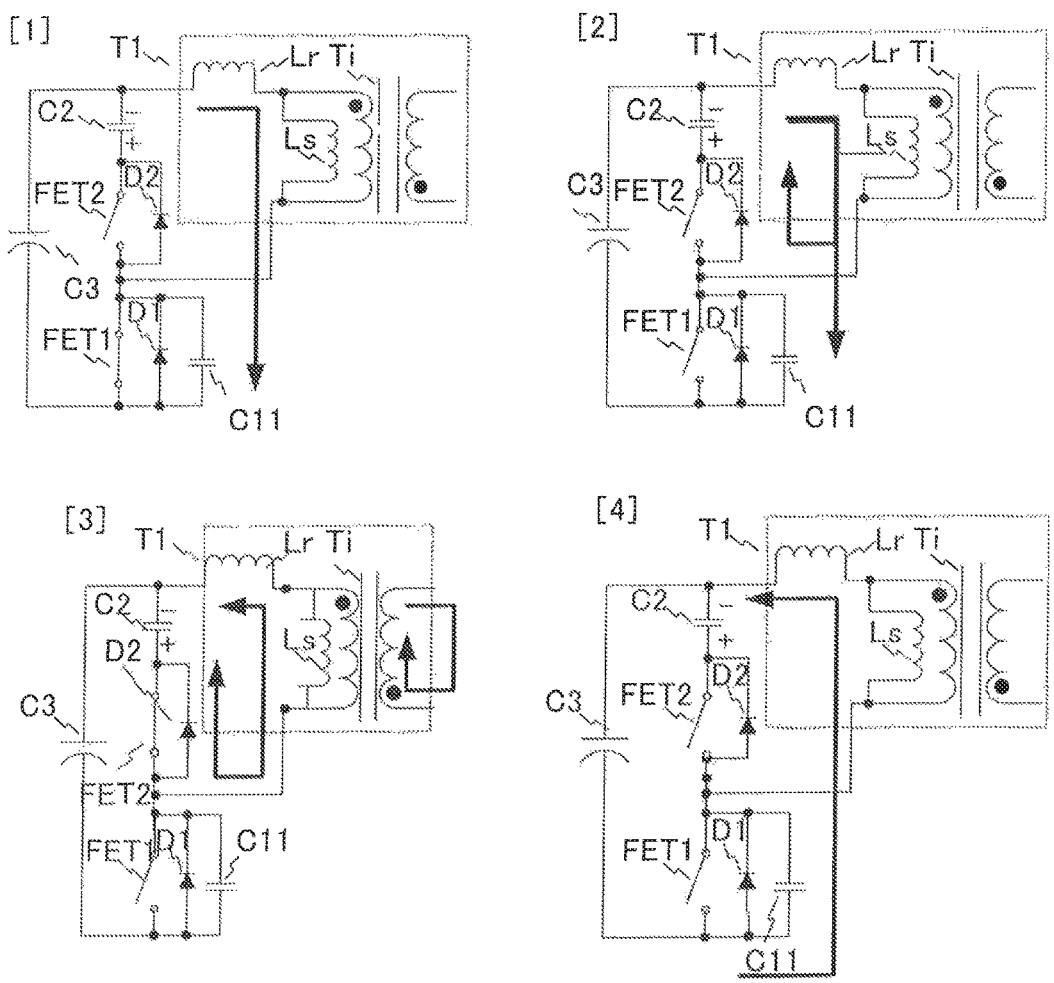
FIG. 2G is a simplified circuit diagram for describing the control methods.

FIGS. 2A to 2G are diagrams for describing control methods of the switching power supply circuit 100 using the active clamping method by the control unit 101. FIGS. 2A to 2G show operation waveforms in the state in which the control signal DRV-C is in a low-level state, and the FET12 is turned off. The switching power supply circuit 100 supplies power to the secondary side by alternately turning on/off the FET1 and the FET2 before and after the dead time at which the control unit 101 turns off both of the FET1 and the FET2. Note that the period during which the control unit 101 repeatedly controls the FET1 and the FET2 by alternately turning on/off the FET1 and the FET2 before and after the dead time at which the control unit 101 turns off both of the FET1 and the FET2 is referred to as a switching period (first period). FIGS. 2A to 2F are diagrams showing the voltage waveforms and the current waveforms of the respective terminals in the FET1 and the FET2 separated into a plurality of periods [1] to [4] described below. FIG. 2A is a diagram showing the voltage between a gate terminal and the source terminal in the FET1 showing the state of the control signal DRV-L, which is the input signal to the gate terminal of the FET1. FIG. 2B is a diagram showing the voltage between a gate terminal and a source terminal in the FET2 showing the state of the control signal DRV-H, which is the input signal to the gate terminal of the FET2, and FIG. 2C is a diagram showing the voltage between the drain terminal and the source terminal in the FET1. FIG. 2D is a diagram showing a drain current in the FET1, and the drain current in this case includes the current flowing in the diode D1 and the resonance capacitor C11. FIG. 2E is a diagram showing a drain current in the FET2, and the drain current in this case includes the current flowing in the diode D2. FIG. 2F is a diagram showing the current waveform flowing in the secondary-side diode D21 of the transformer T1. Note that each horizontal axis represents the time.

Additionally, FIG. 2G is a diagram showing the flow of the current in each period of the plurality of periods [1] to [4] of FIGS. 2A to 2F in a simplified circuit diagram. Note that the transformer T1 is shown by being divided into a leakage inductance Lr, an excitation inductance Ls, and an ideal transformer Ti. Additionally, in the circuits of FIG. 2G, the current flowing in the respective periods is indicated by bold continuous line arrows.

(Switching Period)

First, the period [1] is the period during which the FET1 is in the turn-on state, and the FET2 is in the turn-off state (FIG. 2A, FIG. 2B). Since the current flows in the primary winding P1 of the transformer T1 from the smoothing capacitor C3, energy is stored in the leakage inductance Lr and the excitation inductance Ls of the transformer T1. At this moment, the voltage between the drain terminal and the source terminal in the FET1 is substantially zero (FIG. 2C), and the drain current flowing in the FET1 is linearly increased (FIG. 2D).

Next, the period [2] is the period during which the FET1 and the FET2 are both in the turn-off state, i.e., the dead time period (FIG. 2A, FIG. 2B). When the FET1 is turned off, the current which was flowing in the primary winding P1 of the transformer T1 flows so as to charge the resonance capacitor C11. Then, the voltage between the drain terminal and the source terminal in the FET1 rises as the resonance capacitor C11 is charged (FIG. 2C). When the voltage between the drain terminal and the source terminal in the FET1 exceeds the voltage of a +terminal of the voltage clamping capacitor C2, the current which was flowing in the primary winding P1 of the transformer T1 starts to flow so as to charge the voltage clamping capacitor C2 via the diode D2. Accordingly, since a kickback voltage by the leakage inductance Lr is absorbed by the voltage clamping capacitor C2, it is possible to suppress the surge voltage applied between the drain terminal and the source terminal in the FET1. Additionally, since the voltage between the drain terminal and the source terminal in the FET2 becomes substantially zero, when it transitions to the period [3] in this state and the FET2 is turned on, it is possible to realize the zero voltage switching of the FET2.

Here, the period [2] may be set substantially equal to or a little longer than the time after the FET1 is turned off until the voltage between the drain terminal and the source terminal in the FET2 becomes substantially zero. When the period [2] is long, since the period during which a current flows in the diode D2 becomes long, the power is consumed in vain for that period. On the other hand, when the period [2] is short, since the FET2 will be turned on before the voltage between the drain terminal and the source terminal in the FET2 becomes zero, the zero voltage switching cannot be performed, and the power is still consumed in vain. Accordingly, it is possible to suppress the power consumption by setting the period [2] to an appropriate value.

Subsequently, the period [3] is the period during which the FET2 is in the turn-on state, and the FET1 is in the turn-off state (FIG. 2A, FIG. 2B). When the FET2 is turned on, the current which was charging the voltage clamping capacitor C2 via the diode D2 starts to flow via the FET2. When the voltage of the voltage clamping capacitor C2 rises, the secondary-side diode D21 becomes the turn-on state, and it becomes the state in which the power is supplied to the secondary side of the switching power supply circuit 100 via the secondary winding S1 of the transformer T1.

Here, in the drain current in the FET2 shown in FIG. 2E, the waveform indicated by a dotted line represents the excitation current flowing through the excitation inductance Ls of the transformer T1, and decreases linearly. Note that the sum of the excitation current flowing through this excitation inductance Ls and the current flowing through the ideal transformer Ti is the drain current in the FET2. Additionally, the current flowing through the ideal transformer Ti is similar to the current flowing in the diode D21 (FIG. 2F).

Additionally, the period [3] is formed by a period [3] off during which the power is not supplied to the secondary side, and a period [3] on during which the power is supplied to the secondary side. During the period [3] off, the current flows in the FET2 mainly by the resonance operation of the voltage clamping capacitor C2 and the leakage inductance Lr and the excitation inductance Ls of the transformer T1. On the other hand, during the period [3] on, the current flows in the FET2 mainly by the resonance operation of the voltage clamping capacitor C2 and the leakage inductance Lr of the transformer T1. The inductance value of the leakage inductance Lr is small compared with the excitation inductance Ls. Therefore, the resonance frequency in the period [3] on is higher compared with the resonance frequency in the period [3] off.

When the excitation current flowing through the excitation inductance Ls of the transformer T1 becomes zero, it means that all the energy accumulated in the excitation inductance Ls is in a released state. When the FET2 is maintained in the turn-on state still after that, in contrast to before, the current starts to flow toward the excitation inductance Ls from the voltage clamping capacitor C2, and the reverse phase energy will be accumulated in the excitation inductance Ls.

Subsequently, the period [4] is the period during which the FET1 and the FET2 are both in the turn-off state again, i.e., the dead time period. When the FET2 is turned off, the current which was flowing in the primary winding P1 of the transformer T1 starts to flow such that the electric charge charged in the resonance capacitor C11 is discharged. The voltage between the drain terminal and the source terminal in the FET1 is decreased as the resonance capacitor C11 is discharged (FIG. 2C). When the voltage between the drain terminal and the source terminal in the FET1 is less than zero, the current which was flowing in the primary winding P1 of the transformer T1 is regenerated by the smoothing capacitor C3 via the diode D1. When it returns to the period [1] in this state, and the FET1 is turned on, it is possible to realize the zero voltage switching of the FET1. Also in the period [4], as in the period [2] described above, it is possible to suppress the power consumption by setting the period [4] substantially equal to or a little longer than the time after the FET2 is turned off until the drain-source voltage of the FET1 becomes substantially zero.

As described above, the flyback power supply apparatus using the active clamping method, which is a switching power supply in this embodiment, repeats the control in the periods [1] to [4]. Accordingly, it is possible to supply the power to the secondary side by performing the zero voltage switching of the FET1 and the FET2, while suppressing the surge voltage by the leakage inductance Lr. Incidentally, the above-described switching power supply circuit 100 is operating in the continuous operation state in which the periods [1] to [4] are repeated. In a general switching power supply circuit, an intermittent operation is performed that includes a switching period during which the FET1 and the FET2 alternately perform the switching operation, and a switching stop period (second period) during which the switching of both of the FET1 and the FET2 is stopped. That is, it is possible to improve the power conversion efficiency more than at the time of the continuous operation by causing the switching power supply circuit to perform the intermittent operation. However, since a ripple is generated in the power supply voltage Vout in the intermittent operation state, it is common to take the intermittent operation state only when the output power is small. Also in the flyback power supply apparatus using the active clamping method of this embodiment, it is possible to improve the power conversion efficiency by setting the intermittent operation state.

[Effect in the Case of Connecting Two Resonance Capacitors in Parallel]

In FIGS. 2A to 2F, the description has been given of the circuit operation waveform in the case where the FET12 in FIG. 1 is set to the turn-off state, and only the resonance capacitor C11 is connected in parallel with the FET1. Next, a description is given of the effect at the time when the FET12 is set to the turn-on state, and the two resonance capacitors C11 and C12 are connected in parallel with the FET1. FIGS. 3A to 3L are diagrams showing the voltage waveforms and the current waveforms of the respective terminals of the FET1 and the FET2, and the switching loss in the cases where the FET12 is turned on and where the FET12 is turned off, which are separated into the plurality of periods [1] to [4] described above. FIG. 3A is a diagram showing the voltage between the gate terminal and the source terminal in the FET1 showing the state of the control signal DRV-L, which is the input signal to the gate terminal of the FET1. FIG. 3B is a diagram showing the voltage between the gate terminal and the source terminal in the FET2 showing the state of the control signal DRV-H, which is the input signal to the gate terminal of the FET2, and FIG. 3C is a diagram showing the drain current of the FET1.

FIG. 3D is a diagram showing the voltage between the drain terminal and the source terminal in the FET1, FIG. 3E is a diagram showing the switching loss in the FET1, and FIG. 3F is a diagram showing the switching loss in the FET2. Note that FIGS. 3D to 3F show the waveforms in the case where the FET12 is turned off, i.e., the case where only the resonance capacitor C11 is connected in parallel with the FET1. FIG. 3G is a diagram showing the voltage between the drain terminal and the source terminal in the FET1, FIG. 3H is a diagram showing the switching loss in the FET1, and FIG. 3I is a diagram showing the switching loss in the FET2. FIGS. 3G to 3I show the waveforms in the case where the FET12 is turned on, i.e., the case where the resonance capacitors C11 and C12 are connected in parallel with the FET1. Note that each horizontal axis represents the time. Additionally, the operation waveforms in the periods [1] to [4] are the same as the operation waveforms described above, and a description thereof will be omitted here.

When the FET12 is turned on, the capacitance of the resonance capacitor connected in parallel with the FET1 is increased compared with the case where the FET12 is turned off. Therefore, when the FET1 transitions from the turn-on state to the turn-off state, the rising speed of the voltage between the drain terminal and the source terminal in the FET1 (FIG. 3G) in the case where the FET12 is in the turn-on state is slower compared with the rising speed (FIG. 3D) in the case where the FET12 is in the turn-off state. Accordingly, the lost energy, which is the integral value of the voltage×the current of the FET1, i.e., the switching loss becomes smaller when the FET12 is in the turn-on state (FIG. 3H) than when the FET12 is in the turn-off state (FIG. 3E). Similarly, when the FET2 transitions from the turn-on state to the turn-off state, the lowering speed of the voltage between the drain terminal and the source terminal in the FET2 (FIG. 3G) in the case where the FET12 is in the turn-on state is slower compared with the lowering speed (FIG. 3D) in the case where the FET12 is in the turn-off state. Accordingly, the switching loss in the FET2 becomes smaller when the FET12 is in the turn-on state (FIG. 3I) than when the FET12 is in the turn-off state (FIG. 3F). Since this switching loss occurs for every switching cycle, the switching loss will be larger at the time of the continuous operation than at the time of the intermittent operation.

On the other hand, at the time when the switching power supply circuit 100 starts the switching operation, the electric charge is stored in the resonance capacitor C11. Therefore, when the FET1 is turned on, all the energy equivalent to the charged electric charge, i.e., the energy calculated by (½×the capacitance of the resonance capacitor C11×Vin×Vin) becomes the switching loss. FIGS. 3J to 3L are diagrams showing the circuit waveforms at the time when the switching operation of the switching power supply circuit 100 is started. In FIGS. 3J to 3L, FIG. 3J is a diagram showing the voltage between the gate terminal and the source terminal in the FET1 showing the state of the control signal DRV-L, and FIG. 3K is a diagram showing the voltage between the gate terminal and the source terminal in the FET2 showing the state of the control signal DRV-H. Additionally, FIG. 3L is a diagram showing the voltage between the drain terminal and the source terminal in the FET1. The timing at which the switching power supply circuit 100 described above starts the switching operation refers to the timing of [0] in FIGS. 3J to 3L. At this moment, when the FET12 is in the turn-on state, further, the energy for the electric charge charged in the resonance capacitor C12, i.e., (½×the capacitance of the resonance capacitor C12×Vin×Vin) also becomes the switching loss. However, since this switching loss is the loss generated only at the time of starting the switching operation, when the switching power supply circuit 100 is in the continuous operation state, the loss can be substantially disregarded. Therefore, in this embodiment, in the switching power supply circuit 100, the control unit 101 controls the FET12 such that the FET12 is turned on in the continuous operation state, and the FET12 is turned off in the intermittent operation state.

[Relationship Between Output Power and Power Conversion Efficiency]

Figure 4:
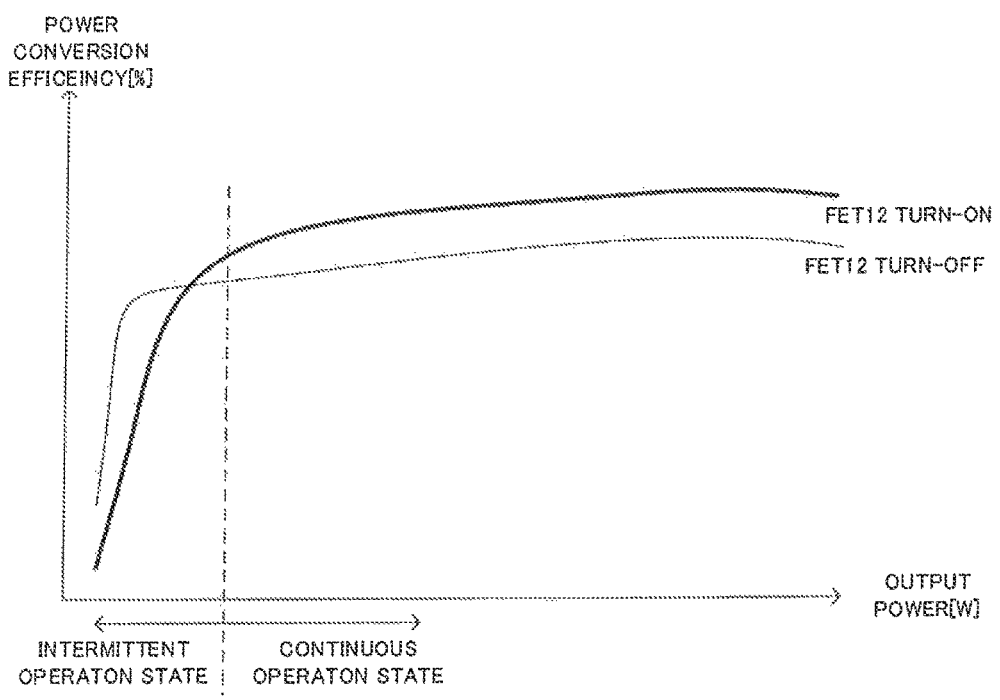
FIG. 4 is a graph showing the relationship between an output power and a power conversion efficiency in Embodiment 1.

FIG. 4 is a graph representing the relationship between the output power supplied to the load from the switching power supply circuit 100 and the power conversion efficiency in each of the cases where the FET12 is in the turn-on state, and where the FET12 is in the turn-off state. In FIG. 4, the vertical axis indicates the power conversion efficiency [%], and the horizontal axis indicates the output power [W] of the switching power supply circuit 100. Additionally, the thick continuous line is a graph representing the relationship between the output power and the power conversion efficiency in the case where the FET12 is in the turn-on state, and a thin continuous line is a graph representing the relationship between the output power and the power conversion efficiency in the case where the FET12 is in the turn-off state. Further, the switching power supply circuit 100 is in the continuous operation state when the output power is higher than a broken line shown in FIG. 4, and is in the intermittent operation state when the output power is lower than the broken line. From FIG. 4, it is possible to realize a low-loss switching power supply circuit both in the continuous operation state and in the intermittent operation state, by setting the FET12 to the turn-on state in the continuous operation state, and setting the FET12 to the turn-off state in the intermittent operation state.

[Switching Timing of Resonance Capacitor]

Figure 5:
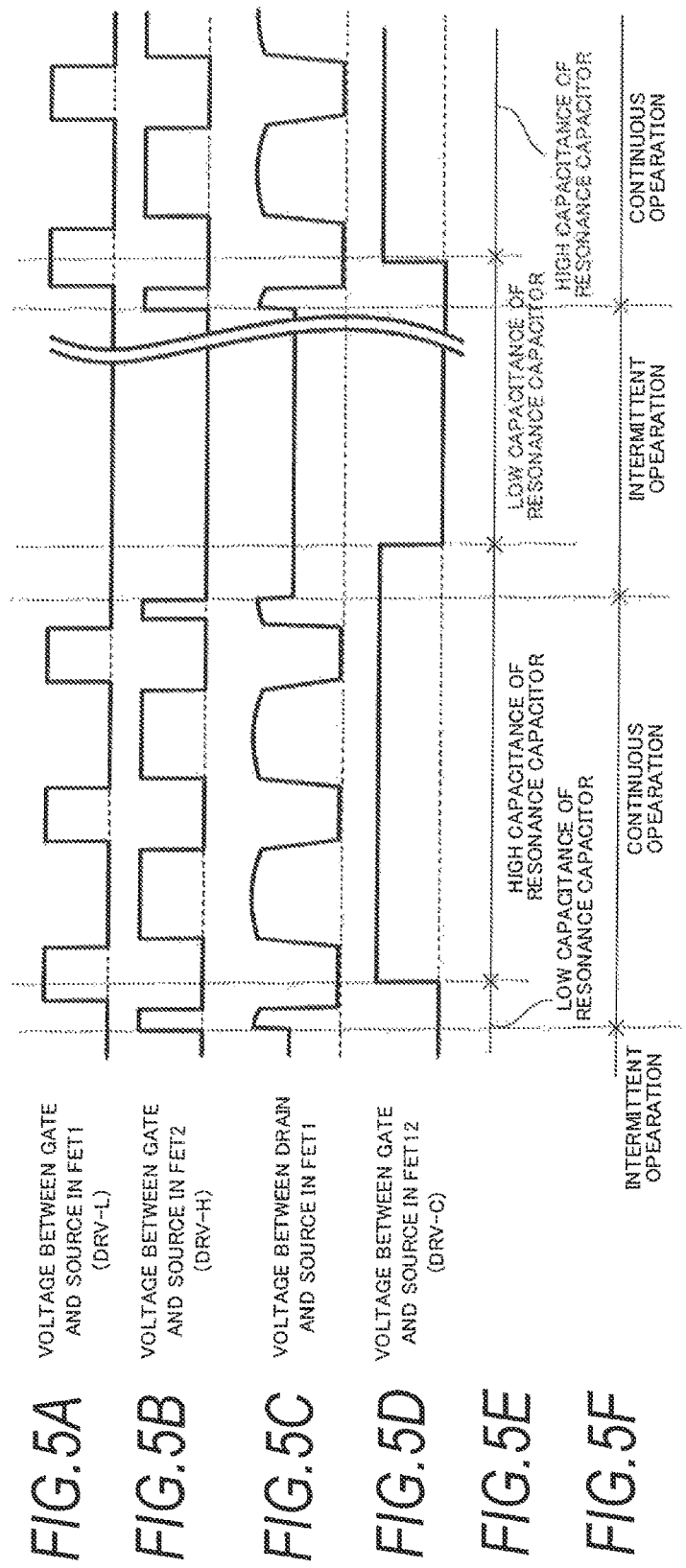
FIGS. 5A, 5B, 5C, 5D, 5E and 5F are diagrams for describing the switching timing of the resonance capacitor in Embodiment 1.

Next, using FIGS. 5A to 5F, a description is given of the switching timing by the FET12 that switches the connection with the resonance capacitors C11 and C12 and the FET1. FIGS. 5A to 5F are diagrams showing the voltage waveforms in the FET1, the FET2 and the FET12, the capacitance of the resonance capacitor, and the operation state of the switching power supply circuit 100, and the horizontal axis represents the time. FIG. 5A is a diagram showing the voltage between the gate terminal and the source terminal in the FET1 showing the state of the control signal DRV-L, and FIG. 5B is a diagram showing the voltage between the gate terminal and the source terminal in the FET2 showing the state of the control signal DRV-H. FIG. 5C is a diagram showing the voltage between the drain terminal and the source terminal in the FET1, and FIG. 5D is a diagram showing the voltage between the gate terminal and the source terminal in the FET12 showing the state of the control signal DRV-C, which is the input signal to the gate terminal of the FET12. FIG. 5E is a diagram showing the capacitance state of the resonance capacitor (the low capacitance of the resonance capacitor and the high capacitance of the resonance capacitor) connected in parallel with the FET1, and FIG. 5F is a diagram showing the operation state (the continuous operation, the intermittent operation) of the switching power supply circuit 100.

First, when the switching power supply circuit 100 is in the intermittent operation state (FIG. 5F), since the output power is low, in order to make the switching loss small, the control signal DRV-C output from the control unit 101 to the FET12 is in a low-level state (FIG. 5D). Thereafter, when the operation state changes from the intermittent operation to the continuous operation (FIG. 5F), during the period in which the voltage between the drain terminal and the source terminal in the FET1 is zero after the FET1 is turned on, the control unit 101 switches the state of the control signal DRV-C to a high level (FIG. 5D). When the state of the control signal DRV-C is switched from a low level to the high level at the time when the voltage between the drain terminal and the source terminal in the FET1 is not zero, a rapid inrush current flows into the resonance capacitor C12. As a result, a noise occurs, leading to a malfunction in the switching power supply circuit 100, or an unstable switching operation due to a reduction in the charging voltage of the resonance capacitor C11. Therefore, it is desirable to perform the switching of turn-on/turn-off of the FET12 when the voltage between the drain terminal and the source terminal in the FET1 is zero.

Subsequently, the control unit 101 makes the switching power supply circuit 100 to change from the continuous operation to the intermittent operation again (FIG. 5F). Then, the control unit 101 switches the control signal DRV-C from a high-level state to a low-level state (FIG. 5D), after the switching operations of both of the FET1 and the FET2 stop (FIG. 5A, FIG. 5B). It is desirable that the timing at which the control signal DRV-C is switched from the high level to the low level is at the time when the voltage between the drain terminal and the source terminal in the FET1 is stable. Additionally, when simple control is prioritized under which the switching of the control signal DRV-C always occurs at the timing when the voltage between the drain terminal and the source terminal in the FET1 becomes zero, the switching may be performed at the following timing. That is, the control signal DRV-C may be switched from the high level to the low level during the period in which the FET1 is in the turn-on state and the voltage between the drain terminal and the source terminal in the FET1 is zero, immediately before the switching power supply circuit 100 changes from the continuous operation to the intermittent operation. Incidentally, this switching control performs switching when the state in which the resonance capacitor capacitance is low occurs only once, immediately before the switching power supply circuit 100 changes from the continuous operation state to the intermittent operation state. Therefore, it is necessary to note that a slight switching loss occurs for that amount.

As stated above, the switching power supply circuit switches the capacitance of the resonance capacitor at an appropriate timing, depending on whether the operation state is in the continuous operation state or in the intermittent operation state. Accordingly, the switching power supply circuit can realize a high power conversion efficiency from the time when the output power is low to the time when the output power is high, while maintaining the stable switching operation.

As described above, according to this embodiment, it is possible to improve the power efficiency in the active clamping power supply apparatus.

<Embodiment 2>

In Embodiment 1, the switching of the capacitance of the resonance capacitor is performed by controlling the FET12, depending on whether the switching operation is in the intermittent operation state or in the continuous operation state. In Embodiment 2, a description is given of an embodiment in which the turn-on/turn-off of the FET12 is controlled depending on whether the target voltage supplied by the switching power supply circuit to the load is DC (direct current) 24V or DC5V.

[Configuration of Power Supply Apparatus]

Figure 6:
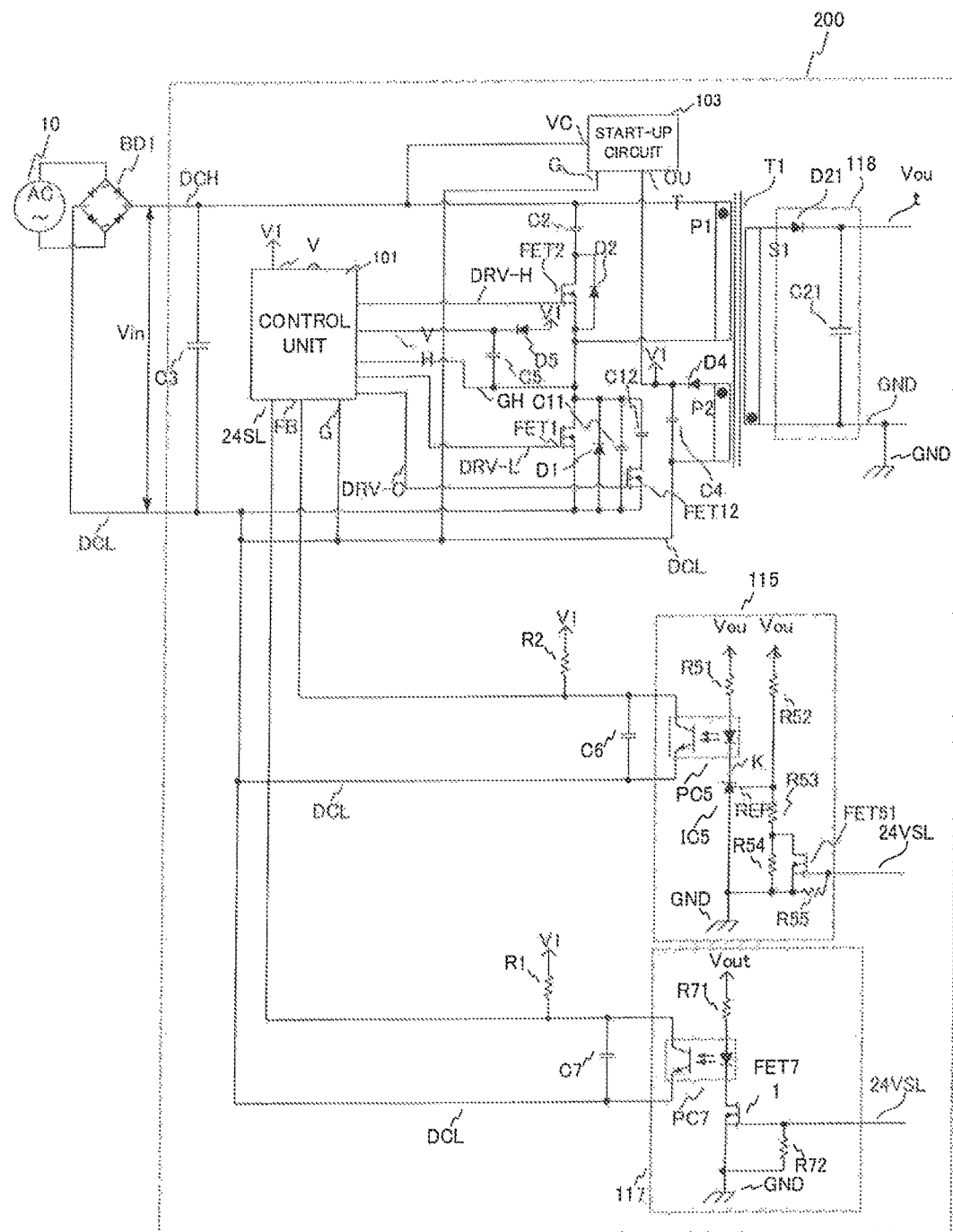
FIG. 6 is a schematic diagram of a power supply circuit of Embodiment 2.

FIG. 6 is a circuit diagram showing the outline of a switching power supply circuit 200 using the active clamping method of Embodiment 2. In comparison with the switching power supply circuit 100 in FIG. 1 of Embodiment 1, a target voltage switching unit 117 for switching the target voltage, which is the power supply voltage Vout supplied to the load, is added to the switching power supply circuit 200 in FIG. 6.

The target voltage switching unit 117, which is a instructing means, inputs a high level or a low level to a 24SL terminal of the control unit 101 as a switching instruction signal for switching the power supply voltage Vout, according to the state of a 24VSL signal that is input from the outside. When the switching power supply circuit 200 outputs a DC24V voltage, which is the second voltage, as the power supply voltage Vout, a high-level 24VSL signal is input. On the other hand, when outputting a DC5V voltage, which is the first voltage, as the power supply voltage Vout, a low-level 24VSL signal is input. When the 24VSL signal is in a high-level state, a FET71 is in the turn-on state, and a current flows in a secondary side diode of a photocoupler PC7 via a resistor R71. As a result, a primary side phototransistor of the photocoupler PC7 is turned on, the charge charged in a capacitor C7 is discharged, and the input voltage of the 24SL terminal of the control unit 101 is in a low-level state. On the other hand, when the 24VSL signal is in a low-level state, the FET71 is in the turn-off state, the secondary side diode of the photocoupler PC7 is in a nonconduction state, and a current does not flow. As a result, the primary side phototransistor of the photocoupler PC7 is in the turn-off state, the capacitor C7 is charged with charge from the power supply voltage V1 via the resistor R1, and the input voltage of the 24SL terminal of the control unit 101 is in the high-level state. Then, the control unit 101 detects whether the target voltage is DC24V or DC5V according to the input voltage of the 24SL terminal. Note that a resistor R72 is a current limiting resistor.

Additionally, in FIG. 6, a FET51 connected in parallel with the voltage dividing resistor R54 of the feedback unit 115 is added, and a resistor R55 is connected between the gate terminal and the drain terminal of the FET51. The 24VSL signal is also input to the gate terminal of the FET51 of the feedback unit 115. When the 24VSL signal is at a high level, the FET51 is turned on, and the voltage dividing resistor R54 is in the state in which it is short-circuited (short circuit). Therefore, the voltage input to the REF terminal of the shunt regulator IC5 is the voltage obtained by dividing the output voltage Vout by the voltage dividing resistors R52 and R53. As a result, the voltage dividing ratio of the reference voltage of the shunt regulator IC5 to the power supply voltage Vout is decreased, and the feedback unit 115 is in the state in which it is operated so that DC24V is output to the power supply voltage Vout. On the other hand, when the 24VSL signal is at a low level, the FET51 is in the turn-off state, and the voltage dividing resistor R53 and voltage dividing resistor R54 are connected in series. Therefore, the voltage input to the REF terminal of the shunt regulator IC5 is the voltage obtained by dividing the output voltage Vout by the voltage dividing resistors R52, R53 and R54. As a result, the voltage dividing ratio of the reference voltage of the shunt regulator IC5 to the power supply voltage Vout is increased, and the feedback unit 115 is in the state in which it is operated so that DC5V is output to the power supply voltage Vout. In this manner, when the power supply voltage Vout is switched, in the feedback unit 115, the voltage dividing resistance value is switched to a resistance value corresponding to the power supply voltage Vout by changing the combination of the voltage dividing resistors. Accordingly, the state of the load to which the power is supplied from the switching power supply circuit 200 is notified from the feedback unit 115 as the FB terminal voltage of the control unit 101.

As described above, in the case of the intermittent operation state, though the power conversion efficiency is high compared with the continuous operation state, since the variation of the power supply voltage Vout due to the variation of the output power is large, the intermittent operation state is not suitable for the case where the variation of the output power is large. Therefore, when the target voltage is DC24V and there is a large output power variation, the switching power supply circuit 200 is always set to the continuous operation state. On the other hand, when the target voltage is DC5V and there is a small output power variation and a high power conversion efficiency is required, the switching power supply circuit 200 switches between the continuous operation state and the intermittent operation state according to the output power.

[Switching of Resonance Capacitor]

Figure 7A:
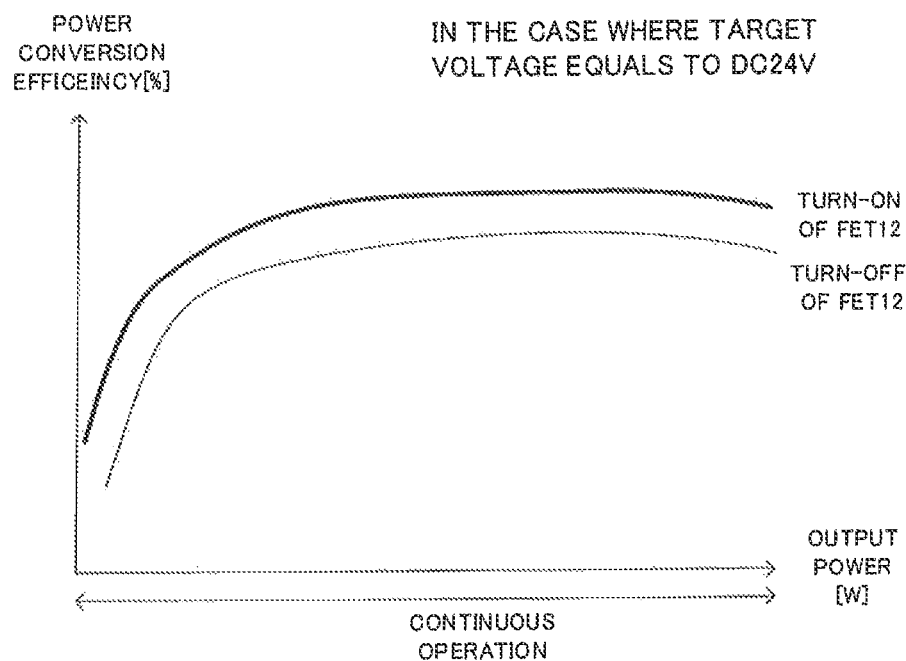

FIGS. 7A and 7B are graphs representing the relationship between the output power supplied to the load by the switching power supply circuit 200 and the power conversion efficiency for each of the cases where the FET12 is in the turn-on state, and where the FET12 is in the turn-off state. FIG. 7A shows the case where the target voltage is DC24V, and FIG. 7B shows the case where the target voltage is DC5V. In FIGS. 7A and 7B, the vertical axis indicates the power conversion efficiency [%], and the horizontal axis indicates the output power [W] of the switching power supply circuit 200. Additionally, in FIGS. 7A and 7B, a thick continuous line is a graph representing the relationship between the output power and the power conversion efficiency in the case where the FET12 is in the turn-on state, and a thin continuous line is a graph representing the relationship between the output power and the power conversion efficiency in the case where the FET12 is in the turn-off state. In the case where the target voltage is DC24V, the switching power supply circuit 200 is in the continuous operation state. On the other hand, in the case where the target voltage is DC5V, when the output power is larger than the broken line shown in FIG. 7B, the switching power supply circuit 200 is in the continuous operation state, and when the output power is smaller than the broken line, the switching power supply circuit 200 is in the intermittent operation state.

In FIG. 7A, when the FET12 is in the turn-on state, compared with the case of the turn-off state, it is shown that the power conversion efficiency with respect to the output power is high in the entire range of the output power. Therefore, when the target voltage is DC24V, since it is always in the continuous operation state, it is better to always set the FET12 to the turn-on state. On the other hand, when the target voltage is DC5V, the FET12 should be turned off in the intermittent operation state, and the FET12 should be turned on in the continuous operation state. However, when the intermittent operation state and the continuous operation state are frequently changed, the control of the FET12 becomes complicated. Therefore, when the target voltage is DC5V, and the power conversion efficiency required when the output voltage is high is not so high, even in the continuous operation state, a simple control will be required when the FET12 remains turned off. Accordingly, in this embodiment, the control unit 101 controls the FET12 such that the FET12 is turned on when the target voltage is DC24V, and the FET12 is turned off when the target voltage is 5V.

Subsequently, using FIGS. 8A to 8F, a description is given of the switching timing of turn-on/turn-off of the FET12. FIGS. 8A to 8F are diagrams showing the voltage waveforms in the FET1, the FET2 and the FET12, the state of the 24VSL signal, the capacitance of the resonance capacitor, and the operation state of the switching power supply circuit 200, and the horizontal axis represents the time. FIG. 8A is a diagram showing the voltage between the gate terminal and the source terminal in the FET1 showing the state of the control signal DRV-L, and FIG. 8B is a diagram showing the voltage between the gate terminal and the source terminal in the FET2 showing the state of the control signal DRV-H.

FIG. 8C is a diagram showing the voltage between the drain terminal and the source terminal in the FET1, and FIG. 8D is a diagram showing the voltage between the gate terminal and the source terminal in the FET12 showing the state of the control signal DRV-C, which is the input signal to the gate terminal of the FET12. FIG. 8E is a diagram showing the state (high level, low level) of the 24VSL signal, FIG. 8F is a diagram showing the capacitance state of the resonance capacitor connected in parallel with the FET1, and FIG. 8G is a diagram showing the switching of the target voltages (5V, 24V) of the switching power supply circuit 200.

Also in this embodiment, as in Embodiment 1, it is desirable to switch the turn-on/turn-off state of the FET12 when the voltage between the drain terminal and the source terminal in the FET1 is zero. First, while operating in the state in which the target voltage is DC5V (FIG. 8G), the control signal DRV-C is at a low level (FIG. 8D), and the 24VSL signal is also at a low level (FIG. 8E). Then, when the 24VSL signal is switched from the low level to a high level (FIG. 8E), the control unit 101 switches the target voltage from DC5V to DC24V (FIG. 8G). Thereafter, the FET1 is turned on, and during the period in which the voltage between the drain terminal and the source terminal in the FET1 is zero, the control unit 101 switches the control signal DRV-C to be output to the FET12 from the low level to a high level (FIG. 8D). On the other hand, when the 24VSL signal is switched from the high level to the low level (FIG. 8E), the control unit 101 switches the target voltage from DC24V to DC5V (FIG. 8G). Thereafter, the FET1 is turned on, and during the period in which the voltage between the drain terminal and the source terminal in the FET1 is zero, the control unit 101 switches the control signal DRV-C to be output to the FET12 from the high level to the low level (FIG. 8D).

As stated above, by switching the capacitance of the resonance capacitor according to the target voltage, the switching power supply circuit 200 can have a high power conversion efficiency from the time when the output power is low to the time when the output power is high, while maintaining the stable switching operation with simple control.

As described above, according to this embodiment, it is possible to improve the power efficiency in the active clamping power supply apparatus.

<Embodiment 3>

In Embodiment 2, the switching of the capacitance of the resonance capacitor is performed by controlling the turn-on/turn-off of the FET12, depending on whether the target voltage supplied to the load by the switching power supply circuit is DC (direct current) 24V or DC5V. Here, a description is given of Embodiment 3 in which the timing of turning on/off the FET12 in the configuration of Embodiment 2 is characteristic.

First, using FIG. 9, a description is given of the difference in the waveform of the voltage between the drain terminal and the source terminal in the FET1, due to the difference in the capacitance of the resonance capacitor. (a) in FIG. 9 is the waveform in the case where the capacitance of the resonance capacitor is low (the FET12 is in the turn-off state) and the power supply voltage Vout is 5V, (b) in FIG. 9 is the waveform in the case where the capacitance of the resonance capacitor is low and the power supply voltage Vout is 24V, (c) in FIG. 9 is the waveform in the case where the capacitance of the resonance capacitor is high (the FET12 is in the turn-on state) and the power supply voltage Vout is 5V, and (d) in FIG. 9 is the waveform in the case where the capacitance of the resonance capacitor is high and the power supply voltage Vout is 24V. When the FET1 is turned off, the voltage between the drain terminal and the source terminal in the FET1 rises to the voltage charged to the capacitor C2 in damper and is clamped. However, in practice, the surge voltages (inside broken lines in FIG. 9) are generated due to the influence of the resistance component or inductance component of a pattern, and this is superimposed on the voltage (bold line portions in FIG. 9) being charged to the capacitor C2 in damper. The surge voltage is dependent on the magnitude of the speed=dv/dt at which the voltage between the drain terminal and the source terminal in the FET1 rises. When dv/dt is large, the surge voltage becomes high, and conversely, when dv/dt is small, the surge voltage becomes low. dv/dt is dependent on the capacitance of the resonance capacitor. When the capacitance of the resonance capacitor is low, since the resonance capacitor is quickly charged when the FET1 is turned off, dv/dt becomes large, and as shown in (a) in FIG. 9 and (b) in FIG. 9, the surge voltage also becomes high. Conversely, when the capacitance of the resonance capacitor is high, dv/dt becomes small, and as shown in (c) in FIG. 9 and (d) in FIG. 9, the surge voltage also becomes low.

Incidentally, a voltage Vc2 that is charged to the capacitor C2 in damper is expressed by a formula [Formula 1], by using the input voltage Vin and the power supply voltage Vout.

$$V_{C2}=V_{in}+V_{out}\cdot Nr$$ [Formula 1]

Here, Nr is the ratio (Np1/Ns1) of the number of turns Np1 of the primary winding P1 to the number of turns Ns1 of the secondary winding S1 of the transformer T1. From the formula [Formula 1], the voltage Vc2 charged to the capacitor C2 in damper is proportional to the power supply voltage Vout. That is, the voltage Vc2 charged to the capacitor C2 in damper becomes higher when the target voltage is 24V than when the target voltage is 5V.

The voltage applied between the drain terminal and the source terminal in the FET1 is the voltage obtained by adding the surge voltage to the voltage charged to the capacitor C2 in damper as described above. Therefore, the voltage applied between the drain terminal and the source terminal in the FET1 is the lowest when the capacitance of the resonance capacitor is high and the power supply voltage Vout is 5V ((c) in FIG. 9), and is the highest when the capacitance of the resonance capacitor is low and the power supply voltage Vout is 24V ((b) in FIG. 9).

Figure 10:
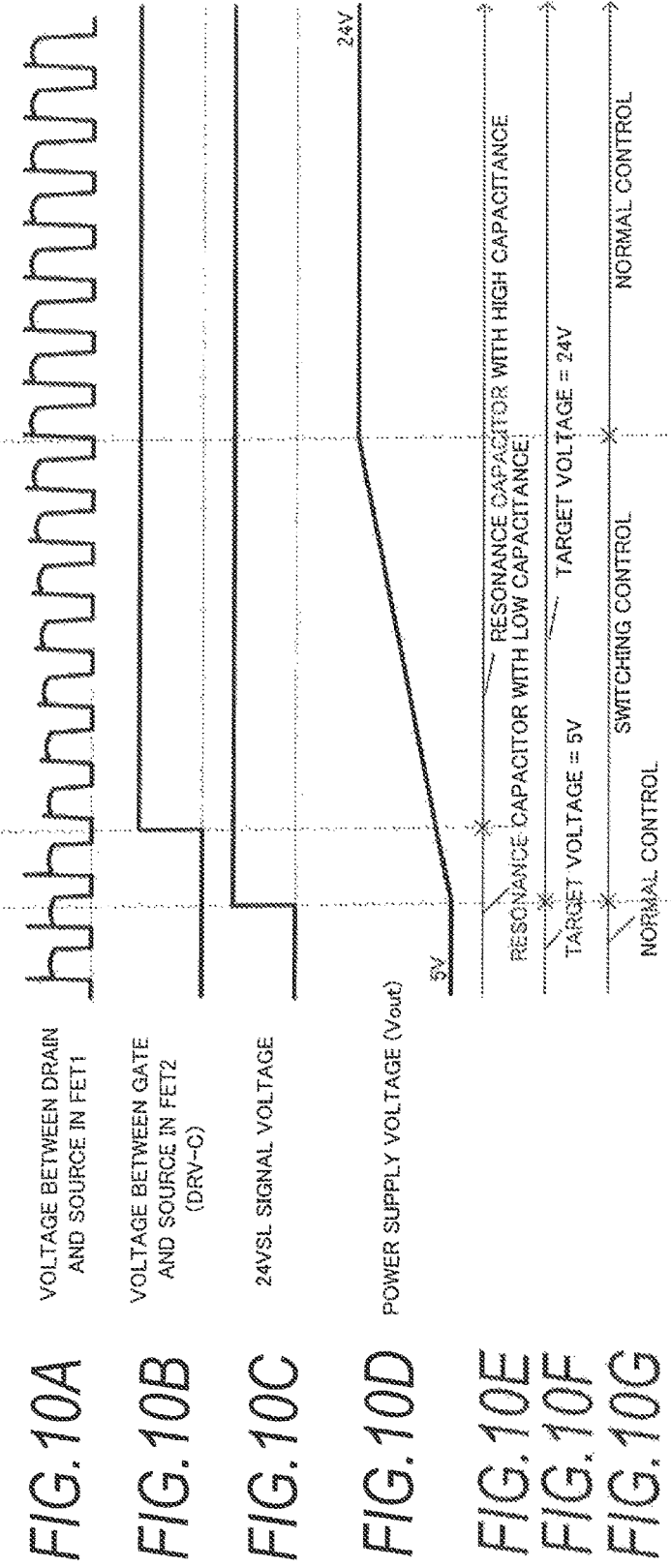
FIGS. 10A, 10B, 10C, 10D, 10E, 10F and 10G are diagrams showing each operation at the switching timing of turn-on/turn-off of a FET12 when switching a target voltage, i.e., when switching a power supply voltage Vout from 5V to 24V.
Figure 11:
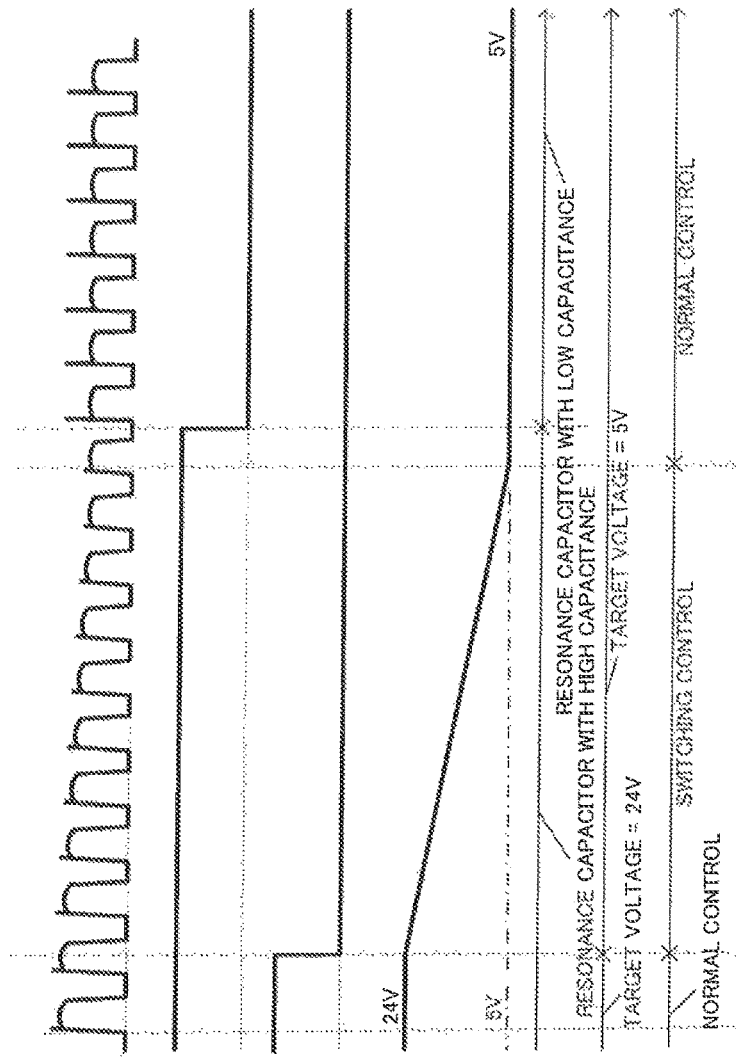
FIGS. 11A, 11B, 11C, 11D, 11E, 11F and 11G are diagrams showing each operation at the switching timing of turn-on/turn-off of the FET12 when switching the target voltage, i.e., when switching the power supply voltage Vout from 24V to 5V.

In this embodiment, the control is performed such that the capacitance of the resonance capacitor is low when the power supply voltage Vout is 5V (FIG. 9 (a)), and the capacitance of the resonance capacitor is high when the power supply voltage Vout is 24V (FIG. 9 (d)). Using FIGS. 10A to 10G and FIGS. 11A to 11G, a description is given of the switching timing of turn-on/turn-off of the FET12 when switching the target voltage. FIG. 10A and FIG. 11A are diagrams showing the voltage between the drain terminal and the source terminal in the FET1, and FIG. 10B and FIG. 11B are diagrams showing the voltage between the gate terminal and the source terminal in the FET12 showing the state of the control signal DRV-C, which is the input signal to the gate terminal of the FET12. FIG. 10C and FIG. 11C are diagrams showing the state (high level, low level) of the 24VSL signal, and FIG. 10D and FIG. 11D are diagrams showing the power supply voltage Vout. FIG. 10E and FIG. 11E are diagrams showing the capacitance state of the resonance capacitor connected in parallel with the FET1, and FIG. 10F and FIG. 11F are diagrams showing the target voltage (5V, 24V) of the switching power supply circuit 200.

FIG. 10G and FIG. 11G are diagrams showing the control state of the power supply voltage Vout, i.e., the control state in which the power supply voltage Vout is stable and controlled to be the target voltage, (normal control), or the control state in which the power supply voltage Vout does not reach the target voltage, and is approaching to the target voltage (switching control). Note that the normal control in this embodiment indicates the state in which the power supply voltage Vout is controlled to be the target voltage by detecting the FB terminal voltage, as has been described. On the other hand, the switching control indicates the state in which the power supply voltage Vout is controlled to change gradually, irrespective of the FB terminal voltage. FIGS. 10A to 10G are diagrams showing each operation at the time of switching the power supply voltage Vout from 5V to 24V, and FIGS. 11A to 11G are diagrams showing each operation at the time of switching the power supply voltage Vout from 24V to 5V.

First, when operating in the state in which the target voltage is DC5V (FIG. 10F), the control signal DRV-C is at the low level (FIG. 10B), and the 24VSL signal is also at the low level (FIG. 10C). A high surge voltage is applied between the drain terminal and the source terminal in the FET1 at this moment (FIG. 10A). When the 24VSL signal is switched from the low level to the high level (FIG. 10C), the control unit 101 switches the target voltage from DC5V to DC24V (FIG. 10F). The control state of the power supply voltage Vout changes from the normal control to the switching control (FIG. 10G), and the power supply voltage Vout starts to rise (FIG. 10D). Thereafter, during the period in which the voltage between the drain terminal and the source terminal in the FET1 is zero, the control unit 101 switches the control signal DRV-C to be output to the FET12 from the low level to the high level (FIG. 10B). Accordingly, the resonance capacitor capacitance is switched from low to high (FIG. 10E), and the surge voltage applied between the drain terminal and the source terminal in the FET1 becomes low (FIG. 10A). Eventually, when the power supply voltage Vout reaches DC24V, which is the target voltage (FIG. 10D), the control state of the power supply voltage Vout returns to the normal control (FIG. 10G). Here, when the control signal DRV-C to be output to the FET12 is switched at the earliest possible timing after the control state of the power supply voltage Vout transitions to the switching control, it is possible to suppress the voltage applied between the drain terminal and the source terminal in the FET1 to be low.

On the other hand, when the 24VSL signal is switched from the high level to the low level (FIG. 11C), the control unit 101 switches the target voltage from DC24V to DC5V (FIG. 11F). The control state of the power supply voltage Vout changes to the switching control again (FIG. 11G), and the power supply voltage Vout starts to decrease (FIG. 11D). Eventually, when the power supply voltage Vout reaches DC5V, which is the target voltage (FIG. 11D), the control state of the power supply voltage Vout returns to the normal control (FIG. 11G). Until then, the surge voltage applied between the drain terminal and the source terminal in the FET1 is maintained to be low (FIG. 11A). Thereafter, during the period in which the voltage between the drain terminal and the source terminal in the FET1 is zero, the control unit 101 switches the control signal DRV-C to be output to the FET12 from the high level to the low level (FIG. 11B). Accordingly, the resonance capacitor capacitance is switched from high to low (FIG. 11E), and the surge voltage applied between the drain terminal and the source terminal in the FET1 becomes high (FIG. 11A). Here, after the control state of the power supply voltage Vout returns to the normal control, when the control signal DRV-C to be output to the FET12 is switched, it is possible to suppress the voltage applied between the drain terminal and the source terminal in the FET1 to be low.

As stated above, it is possible to minimize the voltage applied between the drain terminal and the source terminal in the FET1, by switching the capacitance of the resonance capacitor from low to high as soon as possible after the control state of the power supply voltage Vout transitions to the switching control, when switching the target voltage from DC5V to DC24V, and by switching the capacitance of the resonance capacitor from high to low after the control state of the power supply voltage Vout transitions from the switching control to the normal control, when switching the target voltage from DC24V to DC5V. That is, it becomes possible to use a low withstand voltage FET for the FET1. The switching power supply circuit 200 has a high power conversion efficiency from the time when the output power is low to the time when the output power is high, while maintaining the stable switching operation with simple control, and can also achieve the cost reduction of the FET1.

The switching power supply circuits that are the power supply apparatuses described in Embodiments 1, 2 and 3 are applicable to, for example, a low voltage power supply of an image forming apparatus, i.e., a power supply for supplying power to driving units, such as a controller (control unit) and a motor. Hereinafter, a description is given of the configuration of an image forming apparatus to which the power supply apparatuses of Embodiments 1, 2 and 3 are applied.

[Configuration of Image Forming Apparatus]

Figure 12:
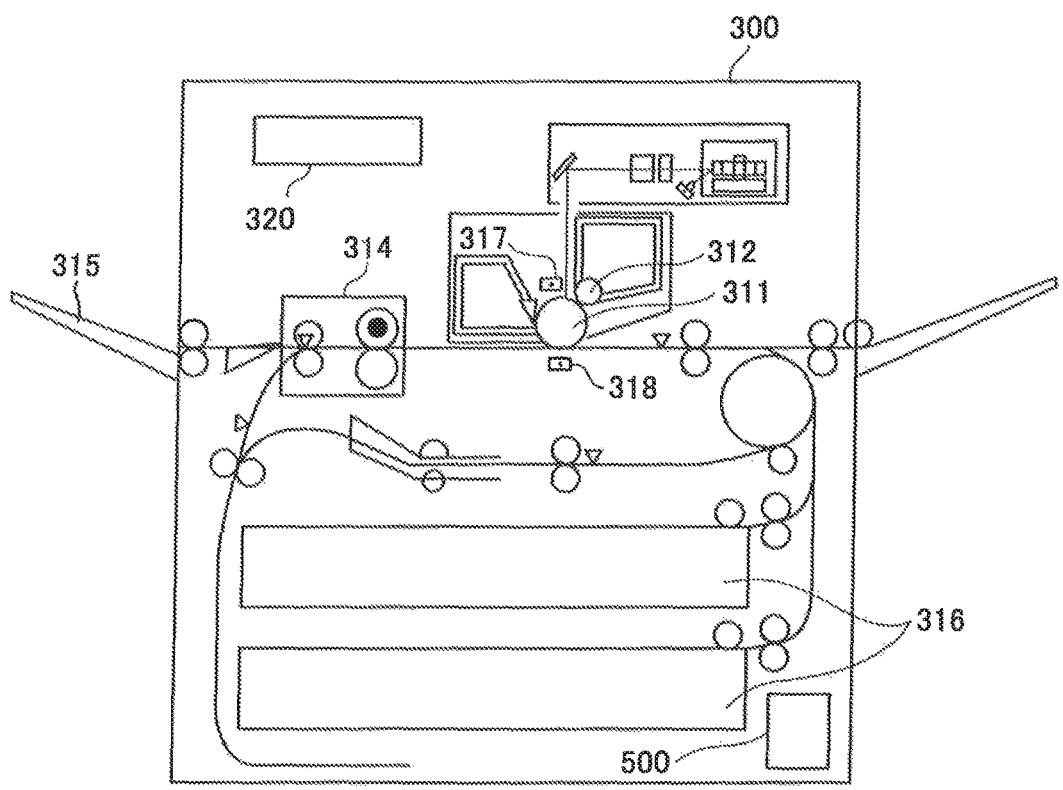
FIG. 12 is a diagram showing an image forming apparatus of Embodiment 3.

A description is given by taking a laser beam printer as an example of the image forming apparatuses. FIG. 12 shows the schematic structure of a laser beam printer, which is an example of an electrophotography printer. A laser beam printer 300 includes a photosensitive drum 311 as an image carrier on which an electrostatic latent image is formed, a charge unit 317 (charging means) for uniformly charging the photosensitive drum 311, and a developing unit 312 (developing means) for developing the electrostatic latent image formed on the photosensitive drum 311 with a toner. Then, a toner image developed on the photosensitive drum 311 is transferred by a transfer unit 318 (transfer means) to a sheet (not shown) as a recording material supplied from a cassette 316, and the toner image transferred to the sheet is fixed by a fixing device 314 and is ejected to a tray 315. These photosensitive drum 311, charge unit 317, developing unit 312, and transfer unit 318 form an image forming unit. Additionally, the laser beam printer 300 includes a power supply apparatus 500 described in Embodiments 1 and 2. Note that the image forming apparatus to which the power supply apparatus 500 of Embodiments 1 and 2 can be applied is not limited to the image forming apparatus illustrated in FIG. 12, and may be an image forming apparatus including a plurality of image forming units, for example. Further, it may be an image forming apparatus including a primary transfer unit for transferring the toner image on the photosensitive drum 311 to an intermediate transfer belt, and a secondary transfer unit for transferring the toner image on the intermediate transfer belt to the sheet.

The laser beam printer 300 includes a controller 320 for controlling the image formation operation by the image forming unit and the conveying operation of the sheet, and the power supply apparatus 500 mentioned in Embodiments 1, 2 and 3 supplies power to the controller 320, for example. Additionally, the power supply apparatus 500 mentioned in Embodiments 1, 2 and 3 supplies power to a driving unit, such as a motor for rotating the photosensitive drum 311, or for driving various rollers to convey the sheet. When the power supply apparatus 500 in this embodiment is the switching power supply circuit 100 in the above-mentioned embodiments, the control unit 101 detects the state of the output power supplied to the load based on the FB terminal voltage, and performs switching to the intermittent operation state or the continuous operation state. In this case, as described in Embodiment 1, the control unit 101 switches the capacitance of the resonance capacitor at an appropriate timing, depending on whether the operation state is the continuous operation state or the intermittent operation state. Accordingly, the switching power supply circuit 100 can realize a high power conversion efficiency from the time when the output power is low to the time when the output power is high, while maintaining the stable switching operation.

Additionally, the image forming apparatus in this embodiment can be operated in a normal operation mode, a standby mode, or a sleep mode. The standby mode is the mode that can conduct the image formation operation as soon as a printing instruction is received, while reducing the power consumed compared with the normal operation mode for performing the image formation operation. The sleep mode is the mode in which the power consumed is further reduced compared to the standby mode. When the power supply apparatus 500 is the switching power supply circuit 200 of Embodiment 2, the controller 320 outputs the 24VSL signal to the switching power supply circuit 200. In the switching power supply circuit 200, as described in the embodiments, the control unit 101 switches the target voltage to DC24V or DC5V based on the 24 SL terminal voltage and the FB terminal voltage, and also performs switching to the intermittent operation state or the continuous operation state. In this case, as described in Embodiment 2, the control unit 101 switches the capacitance of the resonance capacitor at an appropriate timing according to the target voltage. Accordingly, the switching power supply circuit 200 can realize a high power conversion efficiency from the time when the output power is low to the time when the output power is high, while maintaining the stable switching operation with simple control.

As described above, according to the embodiments, it is possible to improve the power efficiency in the active clamping power supply apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-156869, filed Aug. 15, 2017, and Japanese Patent Application No. 2018-128366, filed Jul. 5, 2018, which are hereby incorporated by reference herein in their entirety.

What is claimed is:

1. A power supply apparatus comprising:
a transformer including a primary winding and a secondary winding;
a first switching element connected in series to the primary winding of the transformer;
a resonance capacitor unit connected in parallel with the first switching element;
a second switching element connected in parallel with the primary winding of the transformer;
a capacitor connected in series to the second switching element, and connected in parallel with the primary winding of the transformer with the second switching element;
a feedback unit configured to output information according to an output voltage obtained by rectifying and smoothing a voltage induced by the secondary winding of the transformer; and
a control unit configured to, based on the information output from the feedback unit and which is input to the control unit, control turn-on or turn-off of the first switching element by a first control signal, and to control turn-on or turn-off of the second switching element by a second control signal,
wherein the control unit is capable of performing a continuous operation repeating a period for performing a switching operation that alternately turns on or turns off the first switching element and the second switching element before and after a dead time at which both of the first switching element and the second switching element are turned off, and capable of performing an intermittent operation alternately repeating a period for performing the switching operation and a period for stopping the switching operation, and
wherein the resonance capacitor unit includes a first resonance capacitor, a second resonance capacitor, and a third switching element connected in series to the second resonance capacitor,
wherein the second resonance capacitor and the third switching element are connected in parallel with the first resonance capacitor, and
wherein the control unit turns on the third switching element at the time of the continuous operation, and turns off the third switching element at the time of the intermittent operation.

2. A power supply apparatus according to claim 1, wherein the control unit performs the continuous operation or the intermittent operation based on the information output from the feedback unit.

3. A power supply apparatus according to claim 1, wherein the control unit switches the third switching element from turn-off to turn-on when the first switching element is in a turned-on state after transitioning from the intermittent operation to the continuous operation.

4. A power supply apparatus according to claim 1, wherein the control unit switches the third switching element from turn-on to turn-off when the first switching element is in a turned-on state or in a turned-off state after transitioning from the continuous operation to the intermittent operation.

5. A power supply apparatus comprising:
a transformer including a primary winding and a secondary winding;
a first switching element connected in series to the primary winding of the transformer;
a resonance capacitor unit connected in parallel with the first switching element;
a second switching element connected in parallel with the primary winding of the transformer;
a capacitor connected in series to the second switching element, and connected in parallel with the primary winding of the transformer with the second switching element;
a feedback unit configured to output information according to an output voltage obtained by rectifying and smoothing a voltage induced by the secondary winding of the transformer;

a control unit configured to, based on the information output from the feedback unit and which is input to the control unit, control turn-on or turn-off of the first switching element by a first control signal, and to control turn-on or turn-off of the second switching element by a second control signal; and an instructing unit configured to give an instruction for switching a target voltage of the output voltage to a first voltage, or to a second voltage higher than the first voltage, according to a signal from the outside, the control unit being capable of performing a continuous operation repeating a period for performing a switching operation that alternately turns on or turns off the first switching element and the second switching element before and after a dead time at which both of the first switching element and the second switching element are turned off, and capable of performing an intermittent operation alternately repeating a period for performing the switching operation and a period for stopping the switching operation, and wherein the control unit being capable of switching the voltage according to the instruction from the instructing unit, wherein a resonance capacitor unit includes a first resonance capacitor, a second resonance capacitor, and a third switching element connected in series to the second resonance capacitor, wherein the second resonance capacitor and the third switching element are connected in parallel with the first resonance capacitor, and wherein the control unit turns on the third switching element when the target voltage is the second voltage, and turns off the third switching element when the target voltage is the first voltage.

6. A power supply apparatus according to claim 5, wherein the control unit performs the continuous operation when the target voltage is the second voltage, and performs the continuous operation or the intermittent operation based on the information output from the feedback unit when the output voltage is the first voltage.

7. A power supply apparatus according to claim 5, wherein the feedback unit includes a plurality of voltage dividing resistors for dividing the output voltage, and
the resistance values of the voltage dividing resistors are switched according to the target voltage.

8. A power supply apparatus according to claim 5, wherein the control unit switches the third switching element from turn-off to turn-on when the first switching element is in a turn-on state after the target voltage is switched from the first voltage to the second voltage.

9. A power supply apparatus according to claim 8, wherein the control unit switches the third switching element from turn-off to turn-on by the time the output voltage reaches the second voltage after the instructing unit switches the target voltage from the first voltage to the second voltage.

10. A power supply apparatus according to claim 5, wherein the control unit switches the third switching element from turn-on to turn-off when the first switching element is in a turn-on state after the target voltage is switched from the second voltage to the first voltage.

11. A power supply apparatus according to claim 10, wherein the control unit turns on the third switching element by the time the output voltage reaches the first voltage after the instructing unit switches the target voltage from the second voltage to the first voltage.

12. An image forming apparatus comprising:
an image forming unit configured to perform image formation on a recording material; and
a power supply apparatus configured to supply power to the image forming apparatus,
the power supply apparatus including:
a transformer including a primary winding and a secondary winding;
a first switching element connected in series to the primary winding of the transformer;
a resonance capacitor unit connected in parallel with the first switching element;
a second switching element connected in parallel with the primary winding of the transformer;
a capacitor connected in series to the second switching element, and connected in parallel with the primary winding of the transformer with the second switching element;
a feedback unit configured to output information according to an output voltage obtained by rectifying and smoothing a voltage induced by the secondary winding of the transformer; and
a control unit configured to, based on the information output from the feedback unit and which is input to the control unit, control turn-on or turn-off of the first switching element by a first control signal, and to control turn-on or turn-off of the second switching element by a second control signal,
wherein the control unit is capable of performing a continuous operation repeating a period for performing a switching operation that alternately turns on or turns off the first switching element and the second switching element before and after a dead time at which both of the first switching element and the second switching element are turned off, and capable of performing an intermittent operation alternately repeating a period for performing the switching operation and a period for stopping the switching operation,
wherein the resonance capacitor unit includes a first resonance capacitor, a second resonance capacitor, and a third switching element connected in series to the second resonance capacitor,
wherein the second resonance capacitor and the third switching element are connected in parallel with the first resonance capacitor, and
wherein the control unit turns on the third switching element at the time of the continuous operation, and turns off the third switching element at the time of the intermittent operation.

13. An image forming apparatus according to claim 12, comprising:
a control unit configured to control the power supply apparatus so that a first voltage or a second voltage is output,
wherein the control unit performs control such that the continuous operation is performed when controlled to output the second voltage by the signal from the control unit, and the continuous operation or the intermittent operation is performed according to the state of a load to which power is supplied from the power supply apparatus, when controlled to output the first voltage by the signal from the control unit.

14. An image forming apparatus according to claim 13, wherein the control unit determines the state of the load to which the power is supplied from the power supply apparatus, based on the information input from the feedback unit.

15. An image forming apparatus comprising:
an image forming unit configured to perform image formation on a recording material; and
a power supply apparatus configured to supply power to the image forming apparatus,
the power supply apparatus including:
a transformer including a primary winding and a secondary winding;
a first switching element connected in series to the primary winding of the transformer;
a resonance capacitor unit connected in parallel with the first switching element;
a second switching element connected in parallel with the primary winding of the transformer;
a capacitor connected in series to the second switching element, and connected in parallel with the primary winding of the transformer with the second switching element;
a feedback unit configured to output information according to an output voltage obtained by rectifying and smoothing a voltage induced by the secondary winding of the transformer;
a control unit configured to, based on the information output from the feedback unit and which is input to the control unit, control turn-on or turn-off of the first switching element by a first control signal, and to control turn-on or turn-off of the second switching element by a second control signal; and
an instructing unit configured to give an instruction for switching a target voltage of the output voltage to a first voltage, or to a second voltage higher than the first voltage, according to a signal from the outside,
wherein the control unit is capable of performing a continuous operation repeating a period for performing a switching operation that alternately turns on or turns off the first switching element and the second switching element before and after a dead time at which both of the first switching element and the second switching element are turned off, and capable of performing an intermittent operation alternately repeating a period for performing the switching operation and a period for stopping the switching operation, and
wherein the control unit is capable of switching the target voltage according to the instruction from the instructing unit,
wherein a resonance capacitor unit includes a first resonance capacitor, a second resonance capacitor, and a third switching element connected in series to the second resonance capacitor,
wherein the second resonance capacitor and the third switching element are connected in parallel with the first resonance capacitor, and
wherein the control unit turns on the third switching element when the target voltage is the second voltage, and turns off the third switching element when the target voltage is the first voltage.

16. An image forming apparatus according to claim 15, comprising:
a control unit configured to control the power supply apparatus so that the first voltage or the second voltage is output,
wherein the control unit performs control such that the continuous operation is performed when controlled to output the second voltage by the signal from the control unit, and the continuous operation or the intermittent operation is performed according to the state of a load to which power is supplied from the power supply apparatus, when controlled to output the first voltage by the signal from the control unit.

17. An image forming apparatus according to claim 16, wherein the control unit determines the state of the load to which the power is supplied from the power supply apparatus, based on the information input from the feedback unit.

18. A power supply apparatus comprising:
a transformer including a primary winding and a secondary winding;
a first switching element connected in series to the primary winding of the transformer;
a resonance capacitor connected in parallel with the first switching element;
a second switching element connected in parallel with the primary winding of the transformer;
a capacitor connected in series to the second switching element, and connected in parallel with the primary winding of the transformer with the second switching element;
a feedback unit configured to output information according to a voltage induced by the secondary winding of the transformer;
a control unit configured to, based on the information output from the feedback unit and which is input to the control unit, control turn-on or turn-off of the first switching element by a first control signal, and to control turn-on or turn-off of the second switching element by a second control signal, the control unit being capable of performing a continuous operation repeating a period for performing a switching operation that alternately turns on or turns off the first switching element and the second switching element before and after a dead time at which both of the first switching element and the second switching element are turned off, and capable of performing an intermittent operation alternately repeating a period for performing the switching operation and a period for stopping the switching operation; and
a capacitance switching unit configured to switch the capacitance of the resonance capacitor to a first value at the time of the continuous operation, and to switch the capacitance of the resonance capacitor to a second value smaller than the first value at the time of the intermittent operation.

19. An image forming apparatus comprising:
an image forming unit configured to perform image formation on a recording material; and
a power supply apparatus configured to supply power to the image forming apparatus,
the power supply apparatus including:
a transformer including a primary winding and a secondary winding;
a first switching element connected in series to the primary winding of the transformer;
a resonance capacitor connected in parallel with the first switching element;
a second switching element connected in parallel with the primary winding of the transformer;
a capacitor connected in series to the second switching element, and connected in parallel with the primary winding of the transformer with the second switching element;
a feedback unit configured to output information according to a voltage induced by the secondary winding of the transformer;
a control unit configured to, based on the information output from the feedback unit and which is input to the control unit, control turn-on or turn-off of the first switching element by a first control signal, and to control turn-on or turn-off of the second switching element by a second control signal, the control unit being capable of performing a continuous operation repeating a period for performing a switching operation that alternately turns on or turns off the first switching element and the second switching element before and after a dead time at which both of the first switching element and the second switching element are turned off, and capable of performing an intermittent operation alternately repeating a period for performing the switching operation and a period for stopping the switching operation; and a capacitance switching unit configured to switch the capacitance of the resonance capacitor to a first value at the time of the continuous operation, and to switch the capacitance of the resonance capacitor to a second value smaller than the first value at the time of the intermittent operation.

* * * * *